United States Patent
Yoshiura et al.

(10) Patent No.: US 9,287,816 B2
(45) Date of Patent: Mar. 15, 2016

(54) MOTOR CONTROLLING DEVICE, MOTOR CONTROLLING METHOD AND MACHINERY SYSTEM

(71) Applicant: KABUSHIKI KAISHA YASKAWA DENKI, Kitakyushu-shi (JP)

(72) Inventors: Yasufumi Yoshiura, Kitakyushu (JP); Yasuhiko Kaku, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 102 days.

(21) Appl. No.: 14/148,730

(22) Filed: Jan. 7, 2014

(65) Prior Publication Data
US 2014/0191702 A1 Jul. 10, 2014

(30) Foreign Application Priority Data
Jan. 8, 2013 (JP) .................. 2013-000922

(51) Int. Cl.
*H02P 23/00* (2006.01)
*H02P 25/06* (2006.01)

(52) U.S. Cl.
CPC ............ *H02P 23/0063* (2013.01); *H02P 25/06* (2013.01)

(58) Field of Classification Search
CPC ............ G05B 19/19; G05B 2219/39241; G05B 19/21; G05B 19/4061; G05B 19/416; G05B 2219/41117; G05B 2219/41426; G05B 2219/43117; G05B 23/0243; G05B 23/0272; G05B 5/01; G05D 19/02; G05D 3/12; H02P 23/005; H02P 23/0063; H02P 26/06
USPC ................ 318/128, 460, 461, 466, 629, 651; 327/549; 363/39; 700/245, 264; 702/33
See application file for complete search history.

(56) References Cited

U.S. PATENT DOCUMENTS

| | | | | |
|---|---|---|---|---|
| 4,006,871 A | * | 2/1977 | Simpson | G05D 1/0676 244/186 |
| 5,794,168 A | * | 8/1998 | Sasaki | B60G 17/0152 280/5.507 |
| 5,819,202 A | * | 10/1998 | Sato et al. | 702/33 |
| 5,832,398 A | * | 11/1998 | Sasaki | B60G 17/0152 280/5.515 |

(Continued)

FOREIGN PATENT DOCUMENTS

JP 2009-159774 7/2009

OTHER PUBLICATIONS

Chinese Office Action for corresponding CN Application No. 201310724355.0, Oct. 21, 2015.

*Primary Examiner* — Rita Leykin
(74) *Attorney, Agent, or Firm* — Mori & Ward, LLP

(57) ABSTRACT

A motor controlling device is provided. The device includes a position controller for generating a speed reference based on a positional reference and a motor position, a speed controller for generating a torque reference based on the speed reference and a motor speed, a motor drive for driving a motor based on the torque reference, the motor driving machinery to which an acceleration sensor is attached, an acceleration feedback signal generator for generating a feedback signal to the speed reference based on an acceleration detection signal that is a detection signal of the acceleration sensor, and a positional reference filter inputted with the positional reference and suppressible of low frequency vibration of the machinery.

7 Claims, 21 Drawing Sheets

(56) References Cited

U.S. PATENT DOCUMENTS

| | | | |
|---|---|---|---|
| 6,566,837 B1 * | 5/2003 | Zhang et al. | 318/610 |
| 7,689,320 B2 * | 3/2010 | Prisco et al. | 700/245 |
| 7,791,305 B2 * | 9/2010 | Iwashita et al. | 318/625 |
| 7,865,269 B2 * | 1/2011 | Prisco et al. | 700/264 |
| 7,868,577 B2 * | 1/2011 | Marushita | G05D 19/02 318/609 |
| 8,022,650 B2 * | 9/2011 | Itou | B60L 11/18 318/400.15 |

* cited by examiner

MOTOR CONTROLLING DEVICE, MOTOR CONTROLLING METHOD AND MACHINERY SYSTEM

CROSS-REFERENCE TO RELATED APPLICATION(S)

The application claims priority under 35 U.S.C. §119 to Japanese Patent Application No. 2013-000922, which was filed on Jan. 8, 2013, the entire disclosure of which is hereby incorporated by reference.

TECHNICAL FIELD

The disclosed embodiment relates to a motor controlling device, a motor controlling method, and a machinery system.

BACKGROUND OF THE INVENTION

JP2009-159774A discloses a configuration in which with a motor is driven by a motor controlling device which performs a position feedback control and a speed feedback control to perform an positioning control of machinery coupled to the motor. In particular, JP2009-159774A discloses a configuration in which an acceleration signal of an acceleration sensor attached to the machinery is fed back to a speed reference of the motor controlling device to obtain a vibration control function for the machinery.

SUMMARY OF THE INVENTION

According to one aspect of the disclosed embodiment, a motor controlling device is provided. The device includes a position controller for generating a speed reference based on a positional reference and a motor position, a speed controller for generating a torque reference based on the speed reference and a motor speed, a motor drive for driving a motor based on the torque reference, the motor driving machinery to which an acceleration sensor is attached, an acceleration feedback signal generator for generating a feedback signal to the speed reference based on an acceleration detection signal that is a detection signal of the acceleration sensor, and a positional reference filter inputted with the positional reference and suppressible of low frequency vibration of the machinery.

According to one aspect of the disclosed embodiment, a method of controlling a motor, performed in a motor controlling device, is provided. The device includes a position controller for generating a speed reference based on a positional reference and a motor position, a speed controller for generating a torque reference based on the speed reference and a motor speed, and a motor drive for driving the motor based on the torque reference, where the motor drives machinery. The method includes the steps of generating a feedback signal to the speed reference based on an acceleration detection signal that is a detection signal of an acceleration sensor attached to the machinery, and filtering the positional reference to suppress low frequency vibration of the machinery.

According to one aspect of the disclosed embodiment, a machinery system is provided. The system includes a motor controlling device including a position controller for generating a speed reference based on a positional reference and a motor position, a speed controller for generating a torque reference based on the speed reference and a motor speed, and a motor drive for driving a motor based on the torque reference. The system further includes a motor driven by the motor controlling device, and machinery driven by the motor. An acceleration sensor is attached to the machinery. The motor controlling device further includes an acceleration feedback signal generator for generating a feedback signal to the speed reference based on an acceleration detection signal that is a detection signal of the acceleration sensor, and a positional reference filter inputted with the positional reference and suppressible of low frequency vibration of the machinery.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

Hereinafter, one embodiment is described with reference to the accompanying drawings.

Configuration of Machinery System

Figure 1:
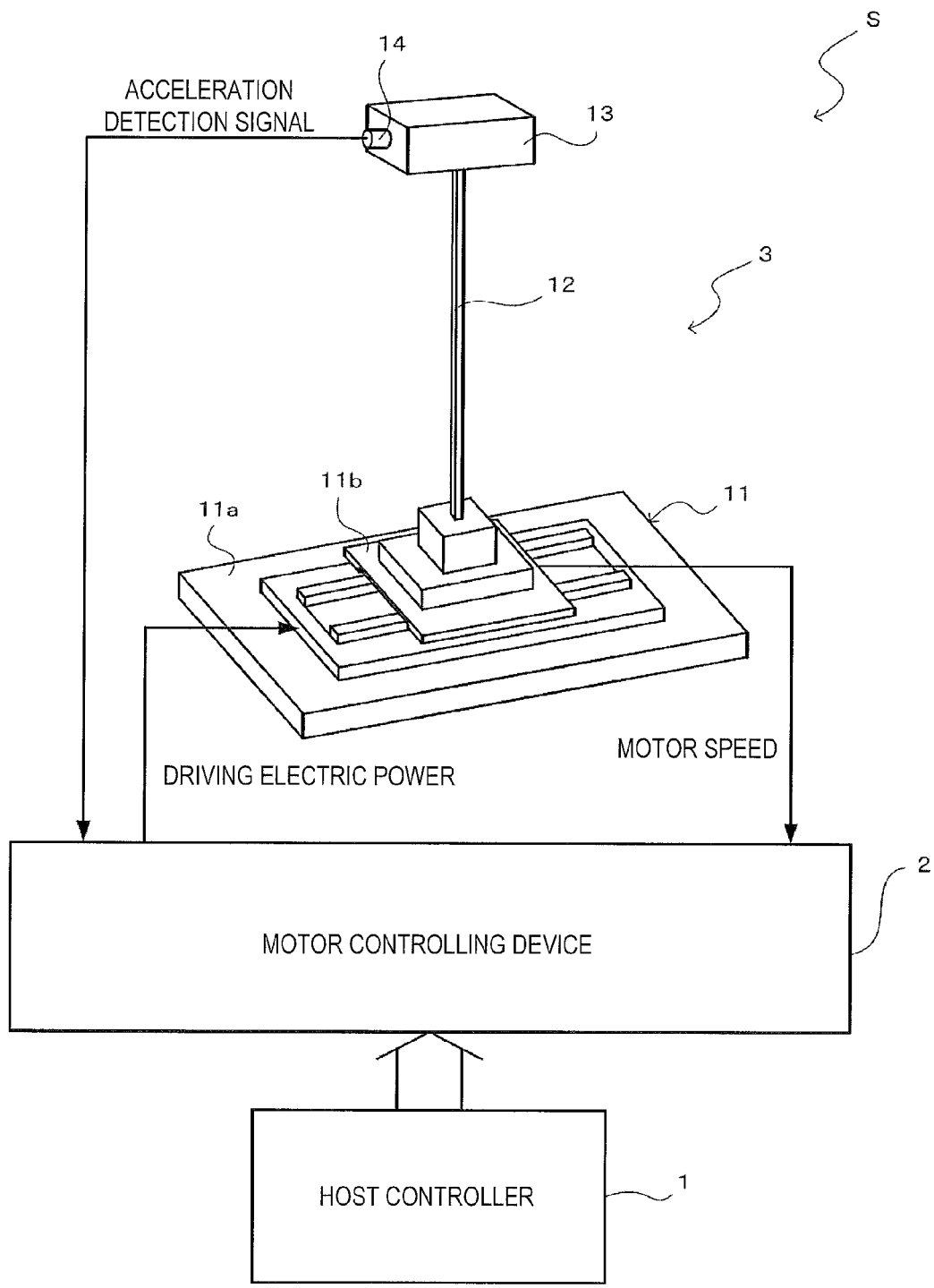
FIG. 1 is a view illustrating a schematic configuration of a machinery system provided with a motor controlling device according to one embodiment.

First, a schematic configuration of a machinery system provided with a motor controlling device according to one embodiment is described with reference to FIG. 1. As illustrated in FIG. 1, a machinery system S of one example of this embodiment controls to position a link coupled to a movable table 11b of a linear motor 11 at a predetermined position in a linear movement direction of the linear motor 11 (positioning control), and the machinery system S includes a host controller 1, a motor controlling device 2, and machinery 3. The host controller 1 outputs to the motor controlling device 2 a positional reference to position an end effector of the machinery, which will be described later, at a predetermined position. The motor controlling device 2 controls the drive of the connected linear motor 11 based on the positional reference inputted from the host controller 1.

The machinery 3 includes the linear motor 11 which is a linear-movement type motor provided with a stator 11a and the movable table 11b, an elastic rod 12 installed vertically on the movable table 11b, an end effector 13 fixed to an upper end of the elastic rod 12, and an acceleration sensor 14 installed in the end effector 13. The elastic rod 12 is a square pillar member made of an elastic material having a sufficient length, and the end effector 13 is a member having a predetermined mass. Since the combination of the elastic rod 12 and the end effector 13 has low rigidity, when the movable table 11b of the linear motor 11 stops suddenly during its movement, mechanical vibration tends to occur so that the combination swings at the base end part of the elastic rod 12.

In the example of this embodiment, the acceleration sensor 14 is attached to one end face in the swinging direction of the end effector 13, i.e., in the moving direction of the movable table 11b of the linear motor 11, and detects acceleration of the end effector 13 in the swinging direction. An acceleration detection signal which is a detection signal of the acceleration sensor 14 is inputted into the motor controlling device 2. Further, a position detector which is not particularly illustrated is provided to the movable table 11b of the linear motor 11, and the position detection signal is detected by the position detector to be inputted into the motor controlling device (the speed value is obtained by the motor controlling device carrying out an approximate differentiation of the position). The motor controlling device 2 supplies driving electric power to the linear motor 11 so that the movable table 11b is moved to be positioned based on the positional reference inputted from the host controller 1, and controls the driving current to suppress vibration of the end effector 13 while referring to the speed detection signal from the movable table 11b and the acceleration detection signal from the acceleration sensor 14.

Control System Model of Machinery System of Example of This Embodiment

Figure 2:
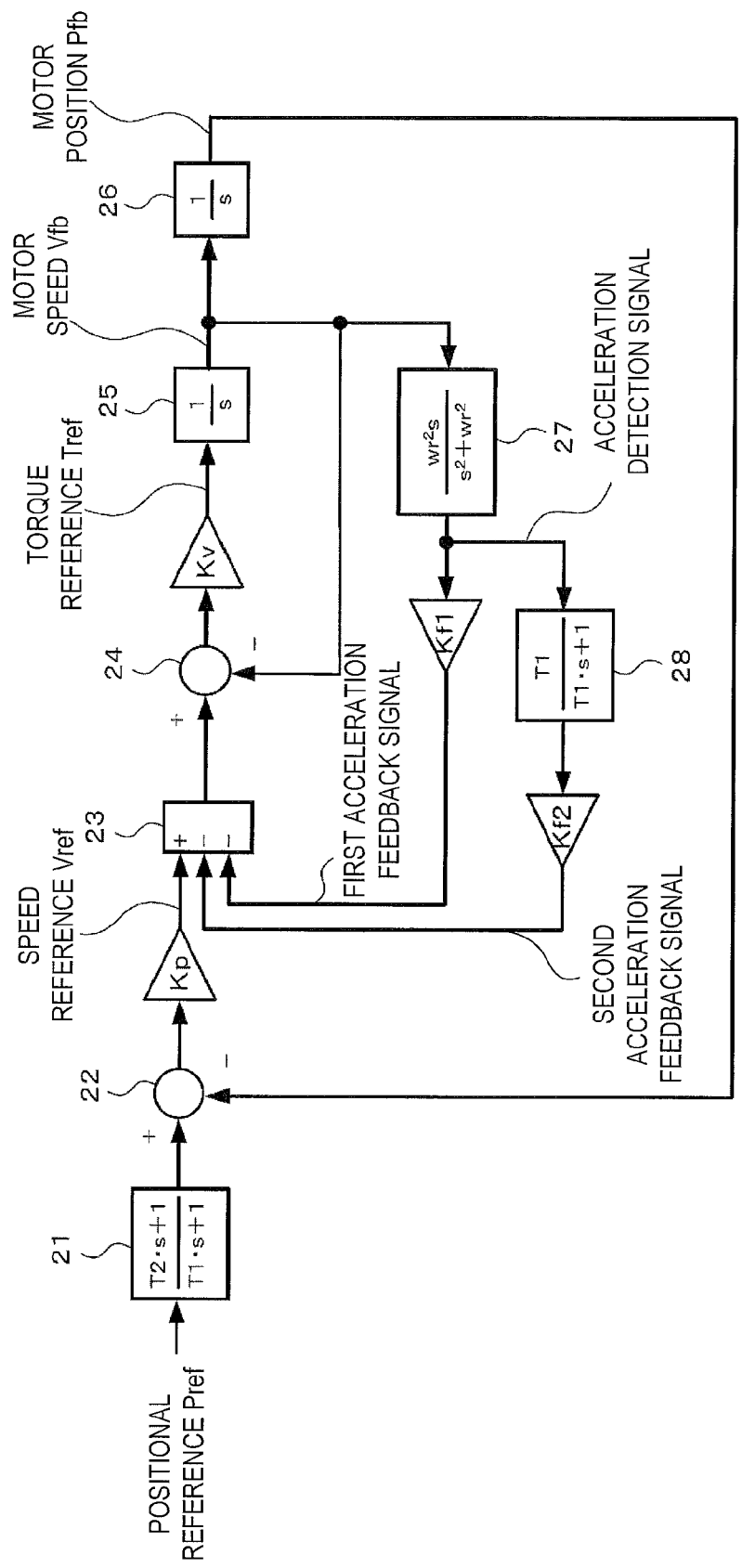
FIG. 2 is a diagram illustrating a control system model of the machinery system as a transfer function form.

FIG. 2 illustrates a control system model of the machinery system S of the example of this embodiment as a transfer function form. Note that, in order to avoid complication of illustration, the control system model is illustrated as a simplified model in which elements such as the host controller 1 and the current control loop are simplified as much as possible. In FIG. 2, the machinery system S includes a positional reference filter 21, a first adder/subtractor 22, a position loop gain Kp, a second adder/subtractor 23, a third adder/subtractor 24, a speed loop gain Kv, a motor model 25, an integrator 26, a machinery model 27, a first acceleration feedback gain Kf1, a primary low pass filter 28, and a second acceleration feedback gain Kf2.

In this embodiment, the positional reference filter 21 is comprised of a filter of a transfer function $(T2 \cdot s+1)/(T1 \cdot s+1)$ having a first time constant T1 in its denominator and a second time constant T2 in its numerator. The positional reference filter 21 inputs the positional reference from the host controller 1 into the positional reference filter 21, and its output value is outputted to the first adder/subtractor 22. Note that software-based procedures executed equivalent to the function of the positional reference filter 21 correspond to a positional reference filtering step in the claims.

The first adder/subtractor 22 subtracts a motor position Pfb (described later) from the positional reference inputted from the positional reference filter 21 to obtain a difference therebetween. A value obtained by multiplying the difference by the position loop gain Kp is outputted to the second adder/subtractor 23 as a speed reference Vref. Note that the position loop gain Kp corresponds to a position controller in the claims.

The second adder/subtractor 23 subtracts a first acceleration feedback signal and a second acceleration feedback signal, which are described later, from the speed reference Vref outputted from the position loop gain Kp to obtain a difference therebetween.

The third adder/subtractor 24 subtracts a motor speed Vfb (described later) from the difference outputted from the second adder/subtractor 23 to obtain a difference therebetween. A value obtained by multiplying the difference by the speed loop gain Kv is outputted to the motor model 25 as a torque reference Tref. Note that the speed loop gain Kv corresponds to a speed controller in the claims.

The motor model 25 is a model which emulates the linear motor 11 in the example of this embodiment (where the inertia J=1 to simplify), and is comprised of an integrator 1/s which integrates the torque references Tref inputted from the speed loop gain Kv with respect to time. Thus, the motor model 25 outputs a motor speed Vfb (the moving speed of the movable table 11b). The motor speed Vfb is inputted into the third adder/subtractor 24 and the machinery model 27, respectively.

In this embodiment, the machinery model 27 can be expressed by a transfer function $(wr^2 s)/(s^2+wr^2)$ corresponding to a combination of the movable table 11b, the elastic rod 12, the end effector 13, and the acceleration sensor 14 which are illustrated in FIG. 1. By inputting the motor speed Vfb into the machinery model 27, a signal corresponding to the acceleration detection signal detected from the acceleration sensor 14 is outputted.

The acceleration detection signal outputted from the machinery model 27 is multiplied by the first acceleration feedback gain Kf1, and this multiplied value is inputted into the second adder/subtractor 23 as the first acceleration feedback signal.

In this embodiment, the primary low pass filter 28 can be expressed by a transfer function $T1/(T1 \cdot s+1)$ having the first time constants T1 both in the denominator and the numerator. The acceleration detection signal outputted from the machinery model 27 is inputted into the primary low pass filter 28, its output value is multiplied by the second acceleration feedback gain Kf2, and the multiplied value is inputted into the second adder/subtractor 23 as the second acceleration feedback signal. Note that the second acceleration feedback gain Kf2 corresponds to a gain in the claims, the second acceleration feedback signal corresponds to a feedback signal in the claims, and the primary low pass filter 28 and the second acceleration feedback gain Kf2 correspond to an acceleration feedback signal generator in the claims. Further, software-based procedures executed equivalent to the functions of the primary low pass filter 28 and the second acceleration feedback gain Kf2 correspond to an acceleration feedback signal generation step in the claims.

When the motor speed Vfb outputted from the motor model 25 is inputted into the integrator 26, the output value of the integrator 26 is a position of the movable table 11b of the linear motor 11, i.e., a motor position Pfb, and this motor position Pfb is inputted into the first adder/subtractor 22.

In the above configuration of the control system, in addition to a P-P feedback control by a P feedback loop of the position control system which follows the input of the positional reference Pref (hereinafter, referred to as "the position control system loop") and a P feedback loop of the speed control system (hereinafter, referred to as "the speed control system loop"), an acceleration feedback control, in which the first acceleration feedback signal and the second acceleration feedback signal which are obtained by the acceleration detection signal occasionally passing through the gains Kf1 and Kf2 and the primary low pass filter 28 are fed back to the speed control system loop, is combinedly performed. Note that the part other than the motor model 25 and the machinery model 27 in the control system model illustrated in FIG. 2 corresponds to the motor controlling device 2. Although not illustrated in particular, the motor controlling device 2 also has a feedback loop of a current control system for the torque reference. A model (not shown) of the feedback loop of this current control system corresponds to a motor drive in the claims.

As described above, in the machinery system S according to the configuration of this embodiment, the positional reference filter 21 is provided corresponding to the primary low pass filter 28 provided in order to generate the second acceleration feedback signal, and the positional reference Pref from the host controller 1 is inputted via the positional reference filter 21. Therefore, a generation of low frequency vibration in the machinery 3 can be suppressed. Hereinafter, the reason is described one by one.

Cause of Generation of Low Frequency Vibration in Machinery

Figure 3:
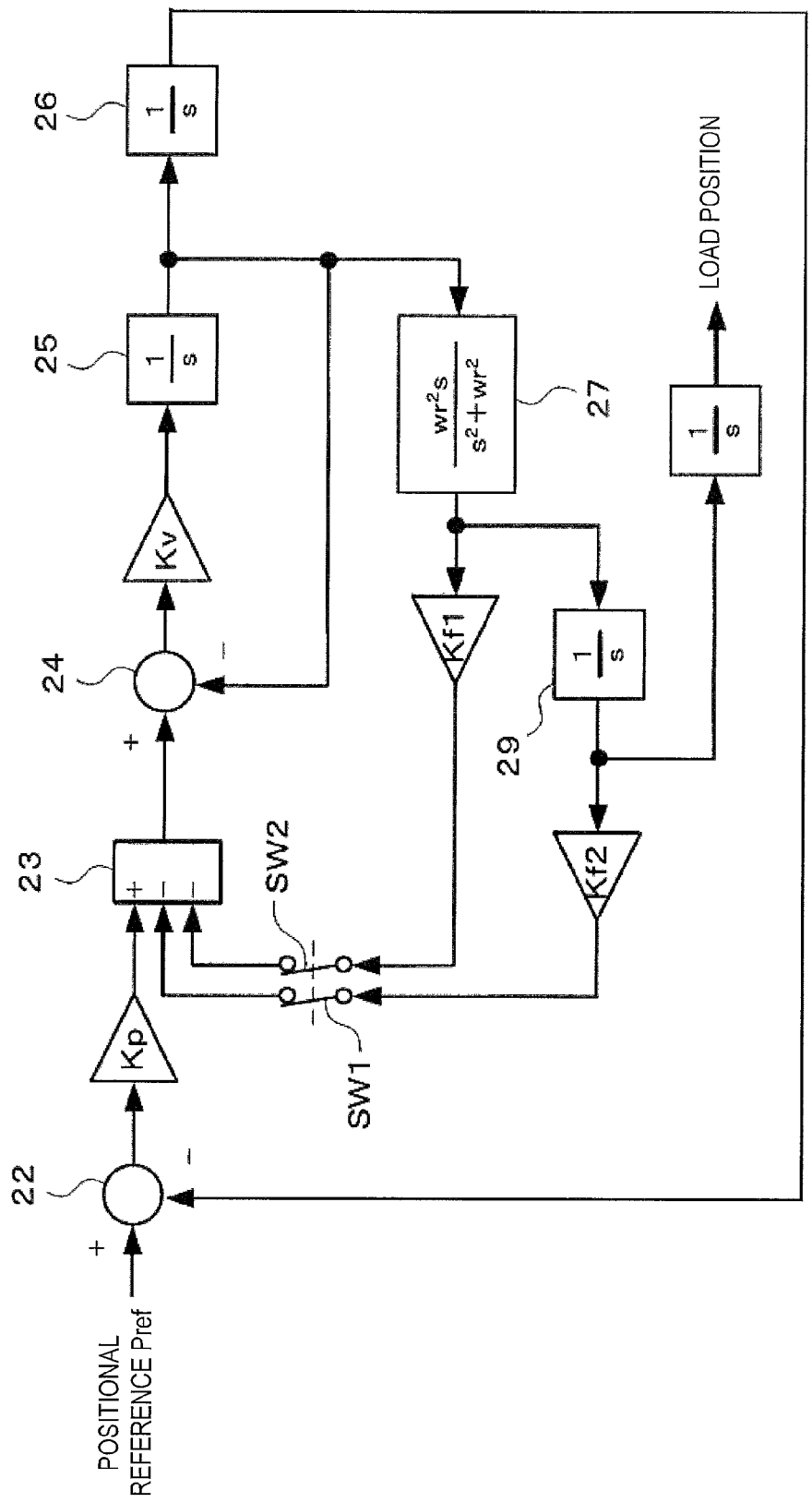
FIG. 3 is a diagram illustrating a control system model when an acceleration feedback control is performed most ideally.

First, the cause of generation of the low frequency vibration in the machinery 3 is described. FIG. 3 illustrates a control system model when the acceleration feedback control is performed most ideally. In FIG. 3, the difference from the control system model illustrated in FIG. 2 is that an acceleration integrator 29 is provided instead of the primary low pass filter 28 for generating the second acceleration feedback signal and, further, the positional reference Pref is directly inputted from the host controller 1 to the first adder/subtractor 22 without providing the positional reference filter 21. Note that the position of the end effector 13 (hereinafter, referred to as "the load position") which serves as a target to be finally controlled is detected by twice integrating the signal outputted from the machinery model 27. Further, considering as a comparative example the case where the first and second acceleration feedback signals are not fed back, i.e., the case where the acceleration feedback control is disabled, two switches SW1 and SW2 are provided to switch the existence of the inputs of the first and second acceleration feedback signals to the second adder/subtractor 23.

Figure 4:
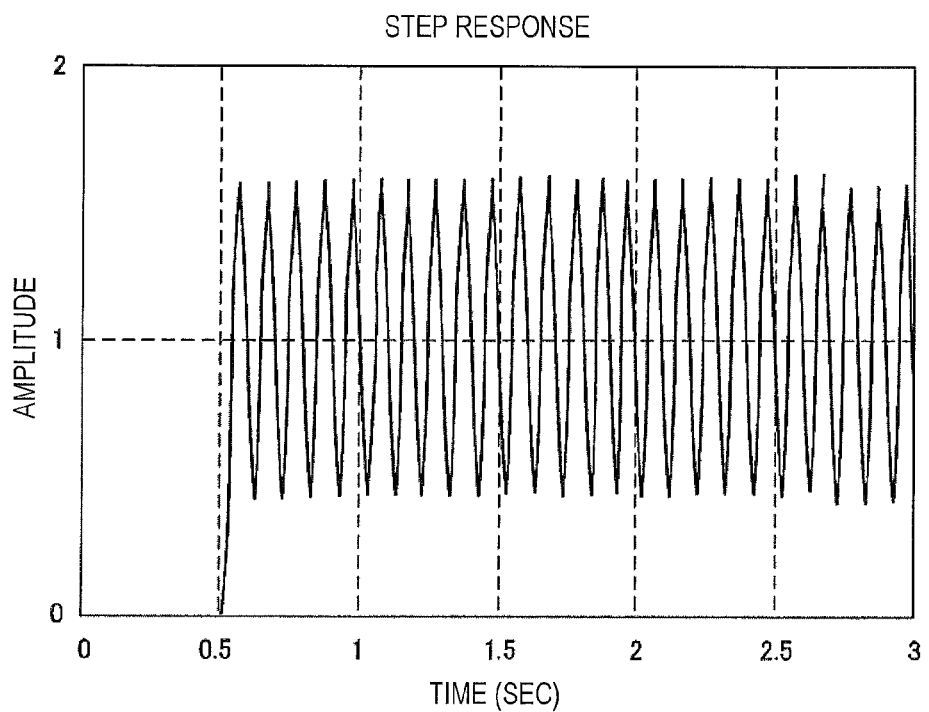
FIG. 4 is a view illustrating a step response when the acceleration feedback control is disabled.
Figure 5:
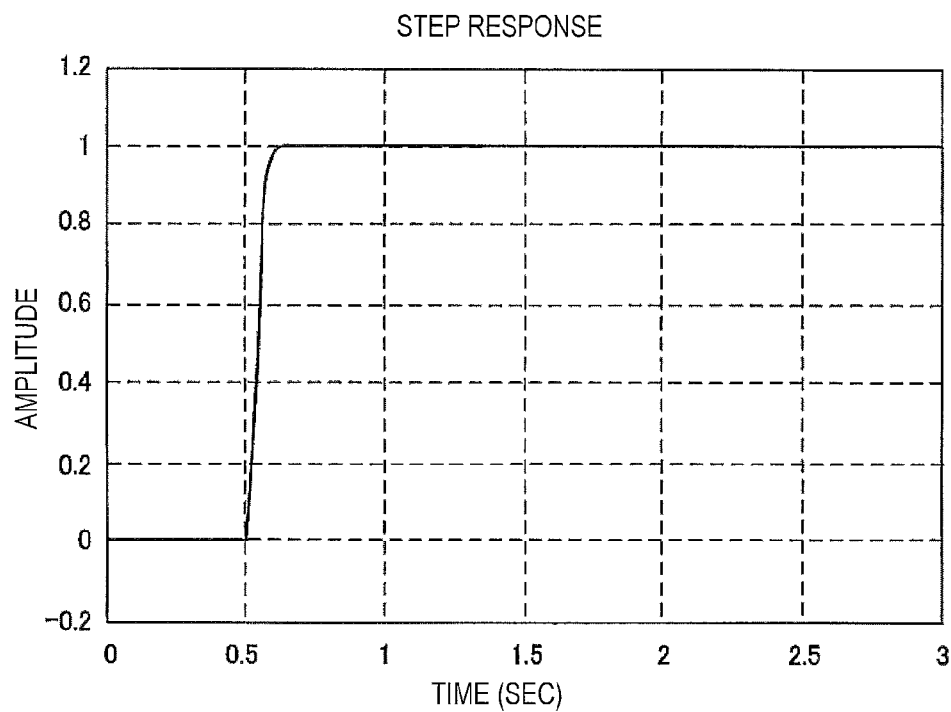
FIG. 5 is a view illustrating a step response when the acceleration feedback control is enabled.

In the control system model illustrated in FIG. 2, when the two switches SW1 and SW2 are switched into an open state to disable the acceleration feedback control, vibration as illustrated in FIG. 4 occurs in a step response at the load position. On the other hand, when the two switches SW1 and SW2 are switched into a closed state to enable the acceleration feedback control, the same step response will be stabilized quickly as illustrated in FIG. 5. This is because the acceleration detection signal outputted from the machinery model 27 is integrated once by the acceleration integrator 29, the acceleration feedback signal (second acceleration feedback signal) can be generated as a suitable signal corresponding to the speed reference, and the acceleration feedback control functions ideally. Although detailed description thereof is omitted, it is also effective for the vibration control function of the position control to use the first acceleration feedback signal for the acceleration feedback control, which is obtained by multiplying the acceleration detection signal only by the first acceleration feedback gain Kf1 without passing through the acceleration integrator 29.

Figure 6:
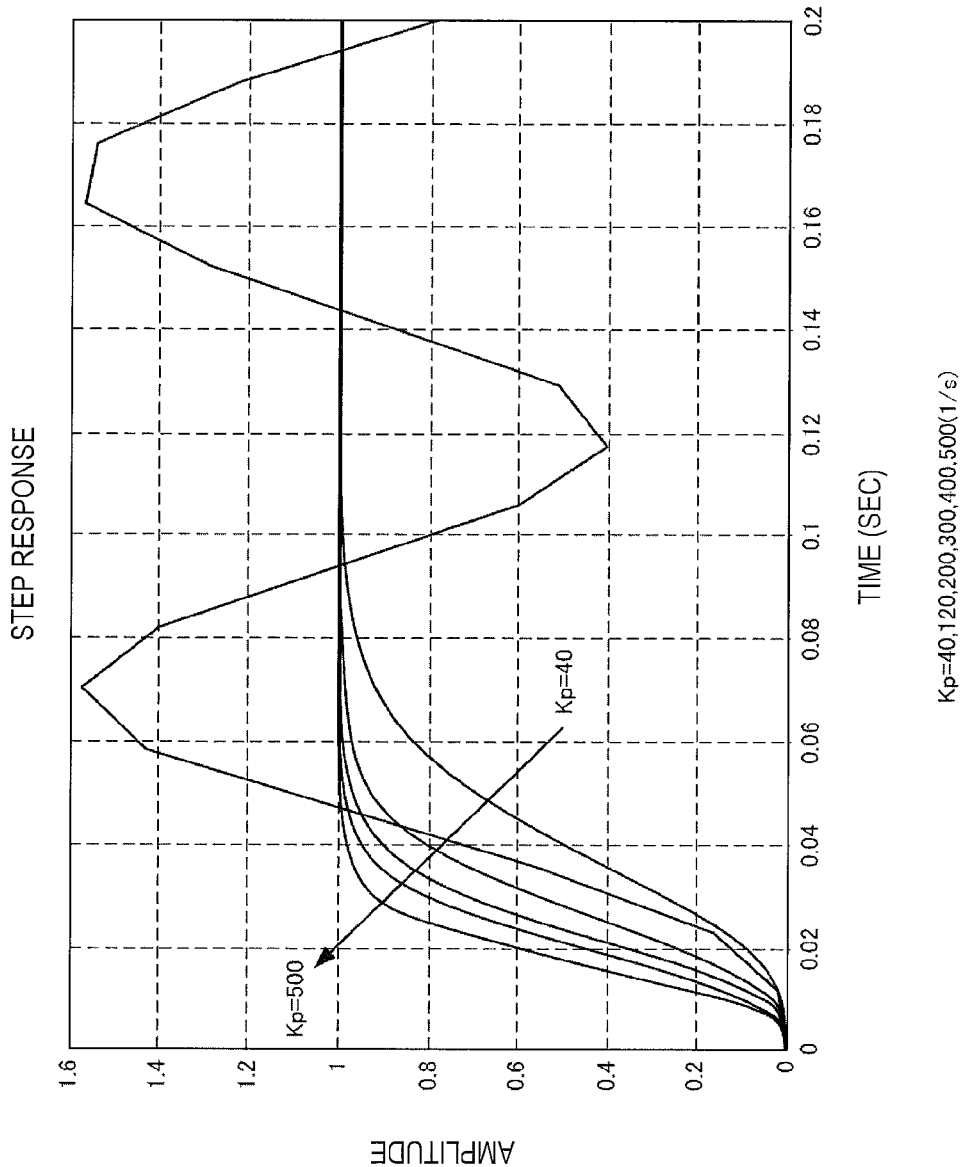
FIG. 6 is a view illustrating a step response when a position loop gain is changed.

Note that the speed and stability of the response of the step response also depends on the position loop gain Kp and the speed loop gain Kv described above. For example, when the position loop gain Kp is changed, as illustrated in FIG. 6, the rate of the step response changes, and vibration may also be generated depending on the value of the position loop gain Kp. For this reason, an ideal acceleration feedback control becomes possible by appropriately setting respective values of the position loop gain Kp, the speed loop gain Kv, the first acceleration feedback gain Kf1, and the second acceleration feedback gain Kf2 with a known method such as a coefficient diagram method.

Figure 7:
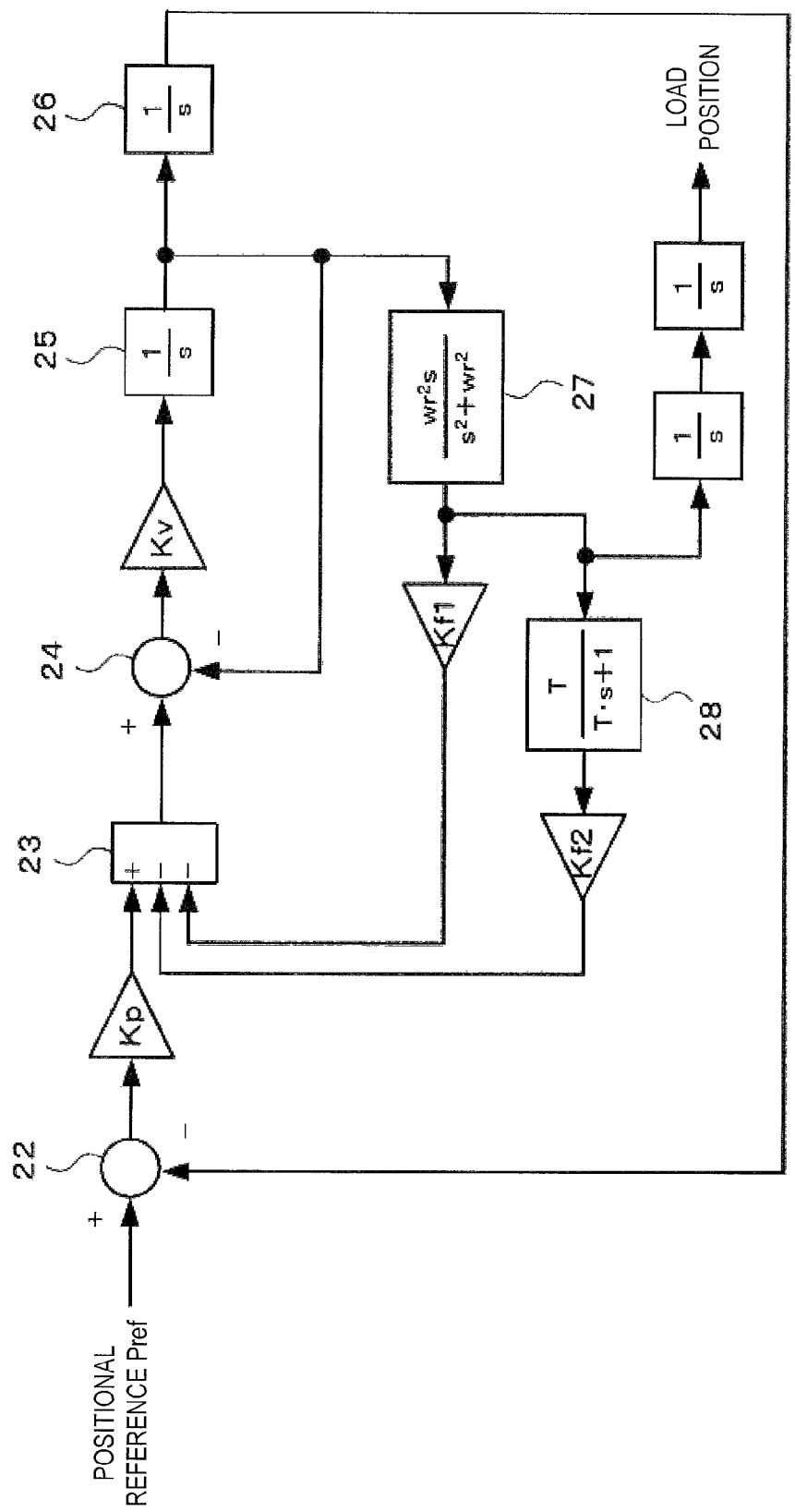
FIG. 7 is a diagram illustrating a control system model when a primary low pass filter is used for the acceleration feedback control.
Figure 8:
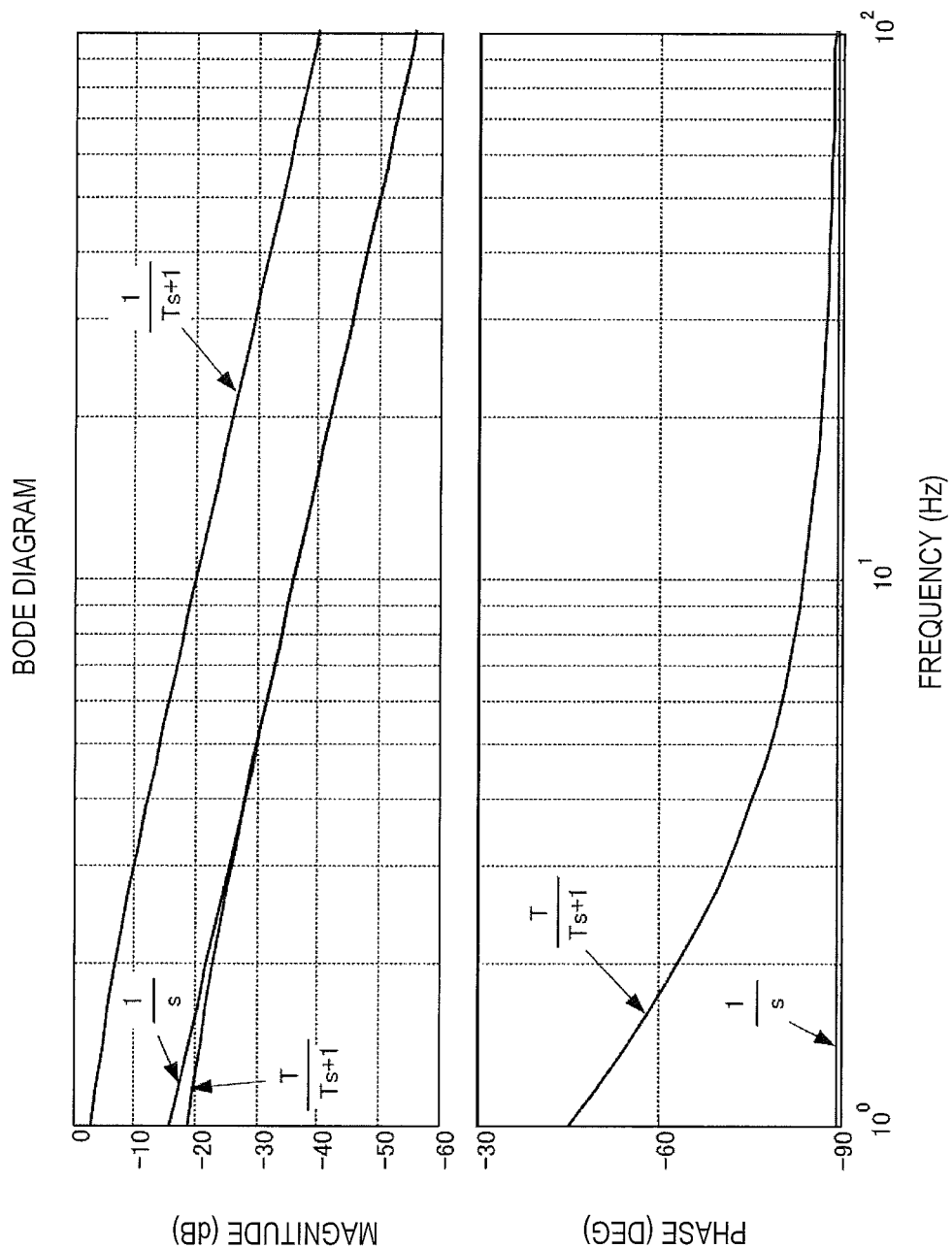
FIG. 8 is a Bode diagram illustrating frequency characteristics of an integrator and the primary low pass filter.
Figure 9:
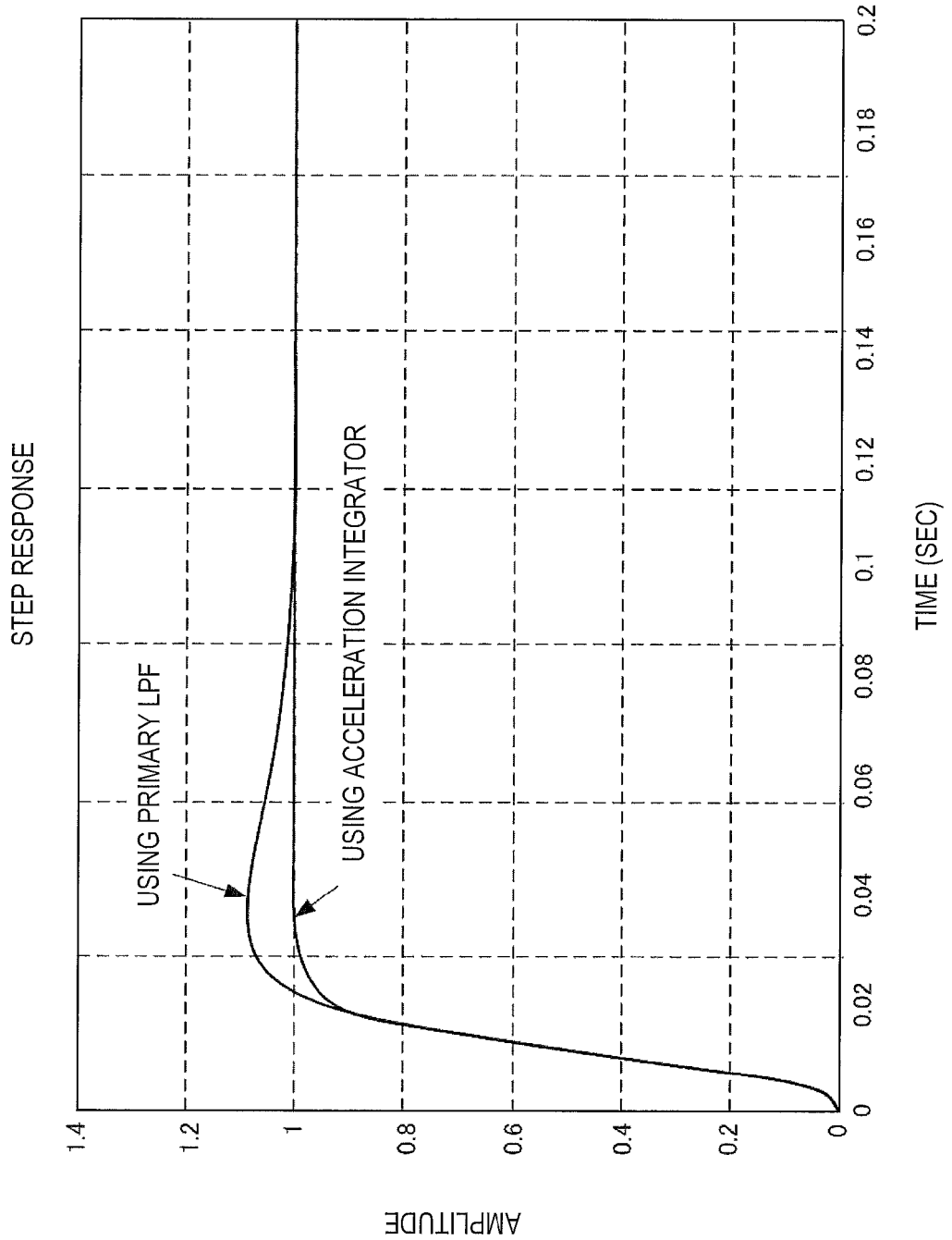
FIG. 9 is a view illustrating step responses when the integrator and the primary low pass filter are used, respectively.

However, it is difficult in terms of implementation to actually perform the acceleration feedback control using the acceleration integrator 29. Specifically, this is because that, since the acceleration integrator 29 integrates DC offsets and drifts during an A/D conversion, a position offset is generated with respect to the positional reference, as a result. Thus, as illustrated in FIG. 7, a configuration in which the second acceleration feedback signal is generated using the primary low pass filter 28 which has similar frequency characteristics instead of the acceleration integrator 29 may be considered. The primary low pass filter 28 is a filter which can be expressed by a transfer function T1/(T1·s+1) having the first time constant T1 in the denominator and the numerator as described above. Since the primary low pass filter 28 has frequency gain characteristics similar to the acceleration integrator 29, which is 1/s, as illustrated in the Bode diagram of FIG. 8, it is thought to be a replacement for the acceleration integrator 29. When the acceleration feedback control is performed using the primary low pass filter 28, the step response is stabilized as illustrated in FIG. 9. However, as compared with the case where the acceleration integrator 29 is used, an overshoot, i.e., low frequency vibration in the machinery 3 occurs as seen in FIG. 9.

Thus, according to the present analyses, it was newly found that the low frequency vibration which is generated when the primary low pass filter 28 is used for the acceleration feedback control is caused by a formation of a dipole in the pole assignment. This will be described below one by one.

Formation of Dipole

Figure 10:
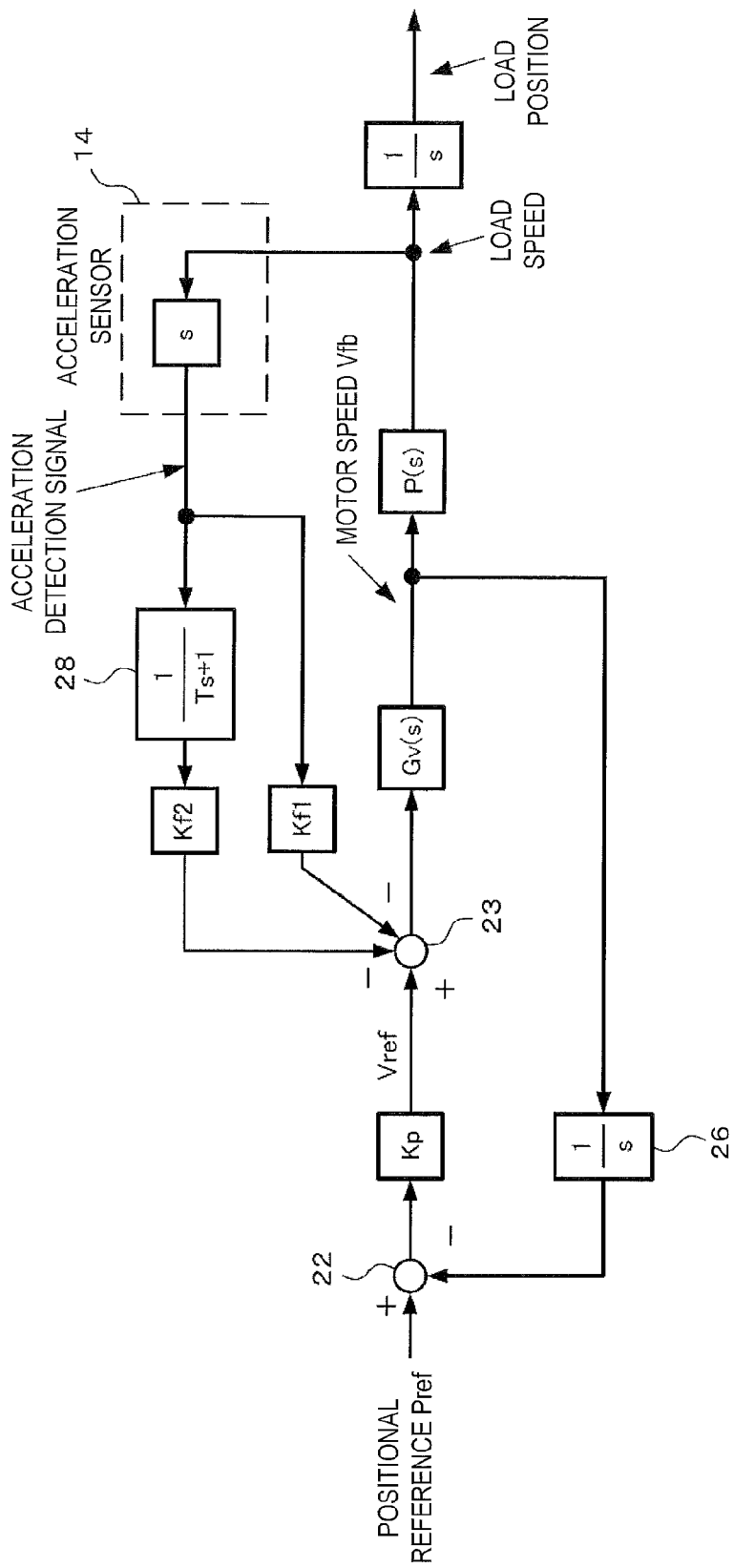
FIG. 10 is a diagram in which the control system model illustrated in FIG. 7 is replaced with another configuration.

Here, the control system model illustrated in FIG. 7 is replaced with a control system model having a configuration of FIG. 10. Note that Gv(s) in FIG. 10 corresponds to the transfer function of the entire speed control system loop which includes the third adder/subtractor 24, the speed loop gain Kv, and the motor model 25 in FIG. 7, and its output corresponds to the motor speed Vfb. Although P(s) in FIG. 10 corresponds to the transfer function of the machinery model 27, its output corresponds to the moving speed of the end effector 13, i.e., the load speed. The acceleration sensor 14 differentiates once the load speed to detect the acceleration detection signal. Further, the motor position Pfb can be obtained by integrating the motor speed Vfb once, and the load position can be obtained by integrating the load speed once. Note that, for the convenience of calculation, in the control system model of FIG. 10, the transfer function of the primary low pass filter 28 is simplified by 1/(T·s+1).

In the control system model described above, the entire transfer function G(s) from the positional reference Pref to the load position can be as follows after being simplified.

$$G(s) = \frac{G_v(s)P(s)K_p(Ts+1)}{[(Ts+1) + G_v(s)P(s)\{K_{f1}(Ts+1) + K_{f2}\}s]s + G_v(s)K_p(Ts+1)} \quad (1)$$

Figure 11:
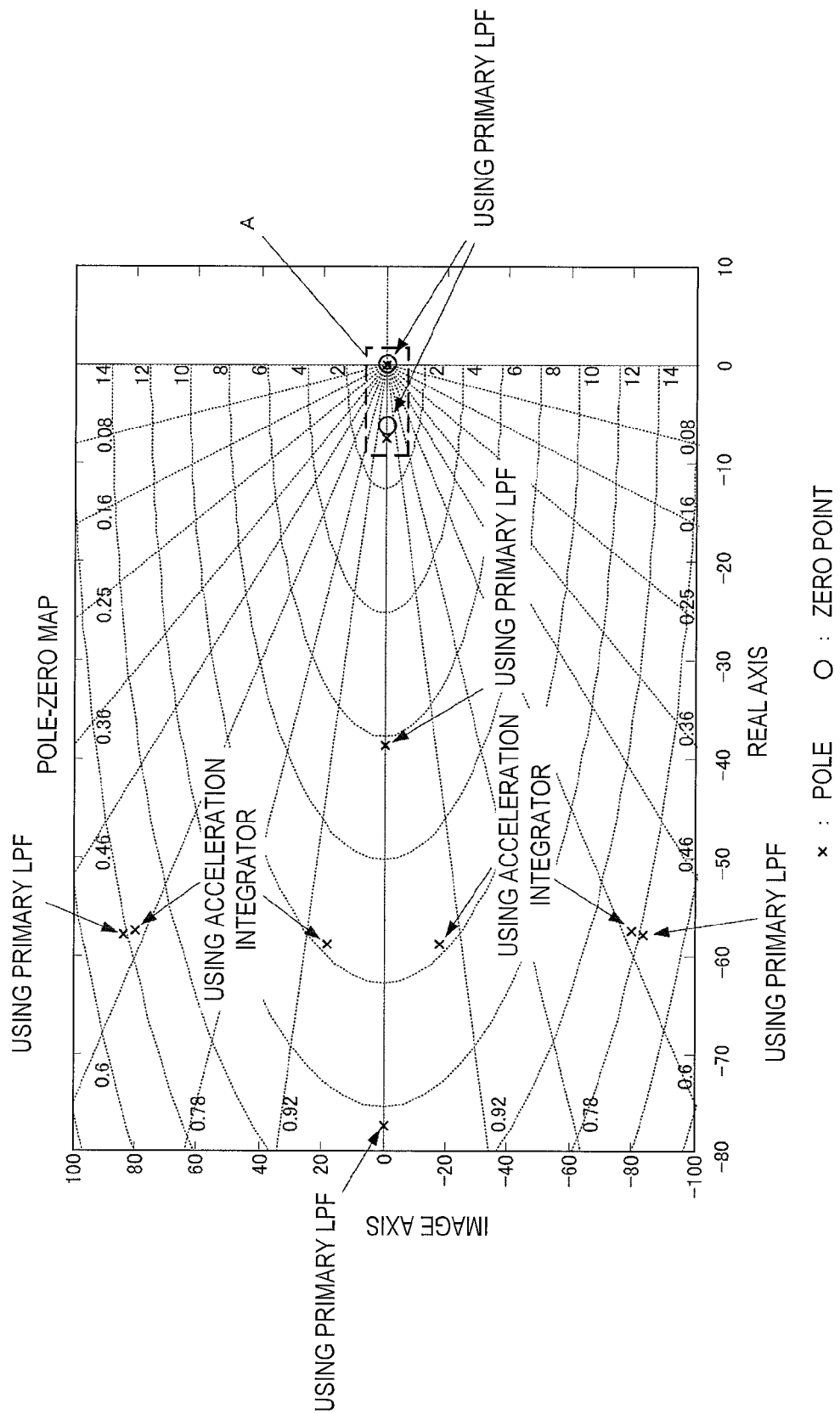
FIG. 11 is a view illustrating a pole assignment of the transfer function of FIG. 10.

As can be seen in this Equation (1), the denominator of the primary low pass filter 28 is contained in the numerator of the transfer function G(s). That is, in Equation (1), the cut-off frequency −1/T(rad/s) of the primary low pass filter 28 serves as a zero point of the transfer function G(s). A plurality of denominators of the primary low pass filter 28 is also contained in the denominator of the transfer function G(s), and such a cut-off frequency affects a plurality of poles of the transfer function G(s). An example of the pole assignment is illustrated in FIG. 11. Note that FIG. 11 also illustrates the pole assignment when the acceleration integrator 29 is used for the acceleration feedback control as a reference (in the case of the control system model of FIG. 3 described above). An enlarged view of the part A near the origin of FIG. 11 is illustrated in FIG. 12.

Figure 12:
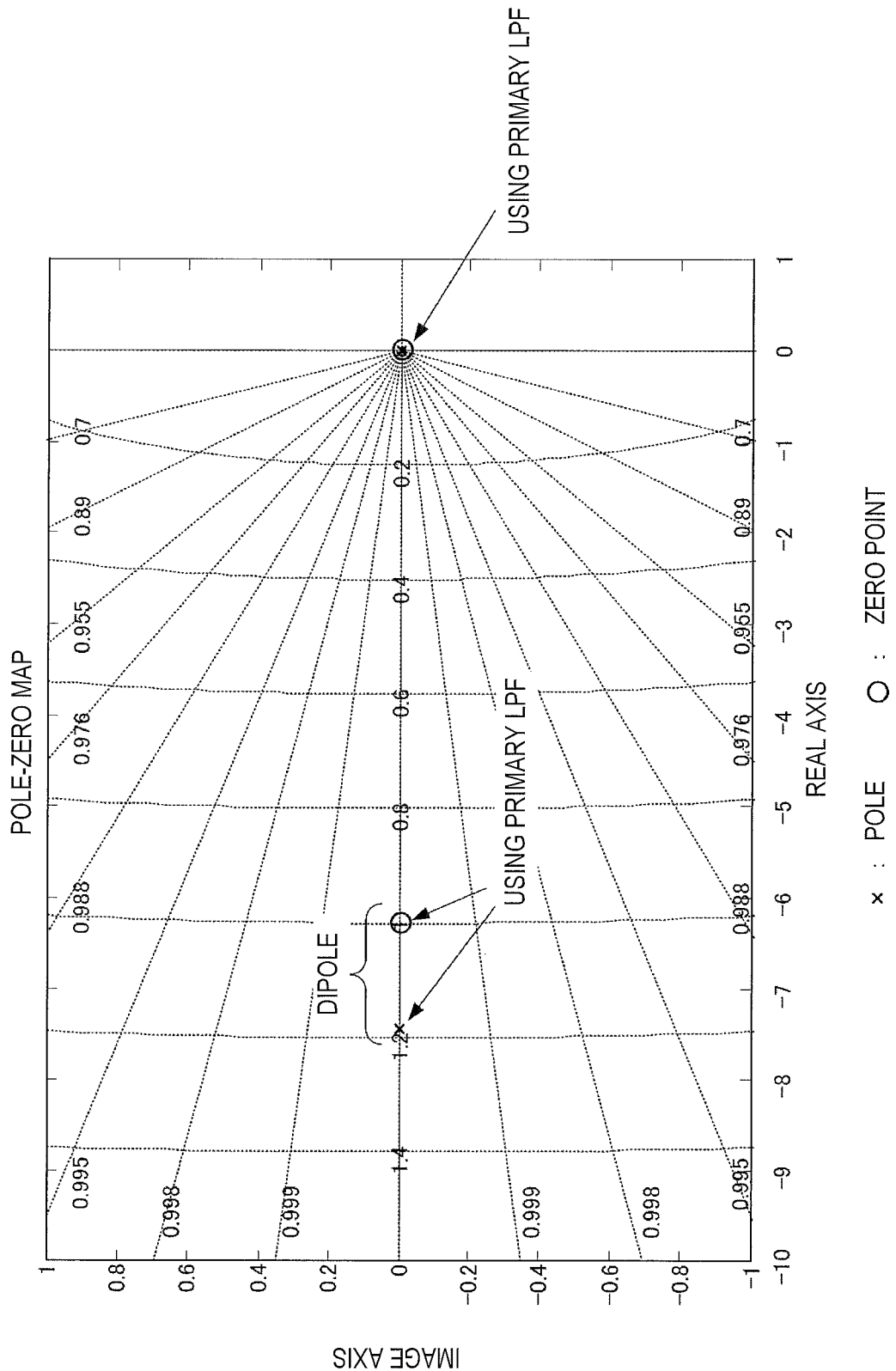
FIG. 12 is an enlarged view of a part A in FIG. 11.

It can be seen that one of the poles is located near the zero point by the primary low pass filter 28, at a position other than the origin of FIG. 12. Generally, in such a case where the assignment relation of the dipole in which the poles are located near the zero point, an overshoot which generates the low frequency vibration at a step response occurs when the zero point is retarded from the pole positions (arrangement near the origin). As described above, since the zero point and the poles which have an dipole assignment relation in the pole assignment of the transfer function G(s) of the entire control system exist when the primary low pass filter 28 is used for the acceleration feedback control, it was found that the low frequency vibration occurs in the machinery 3.

Measures to Suppress Low-Frequency Vibration (1): Remove Zero Point of Dipole

Figure 13:
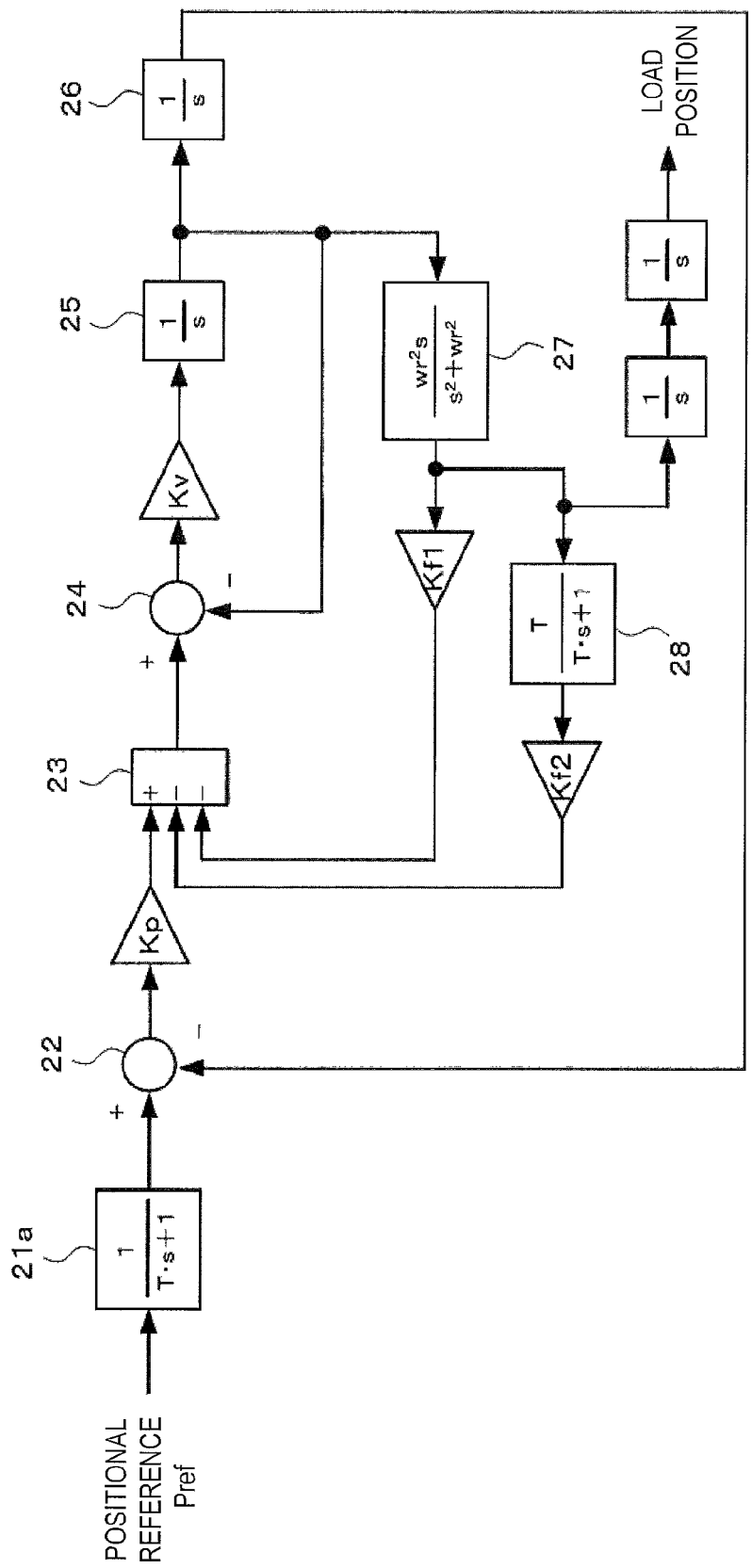
FIG. 13 is a diagram illustrating a control system model when a positional reference filter is provided to remove only a zero point of the transfer function.
Figure 14:
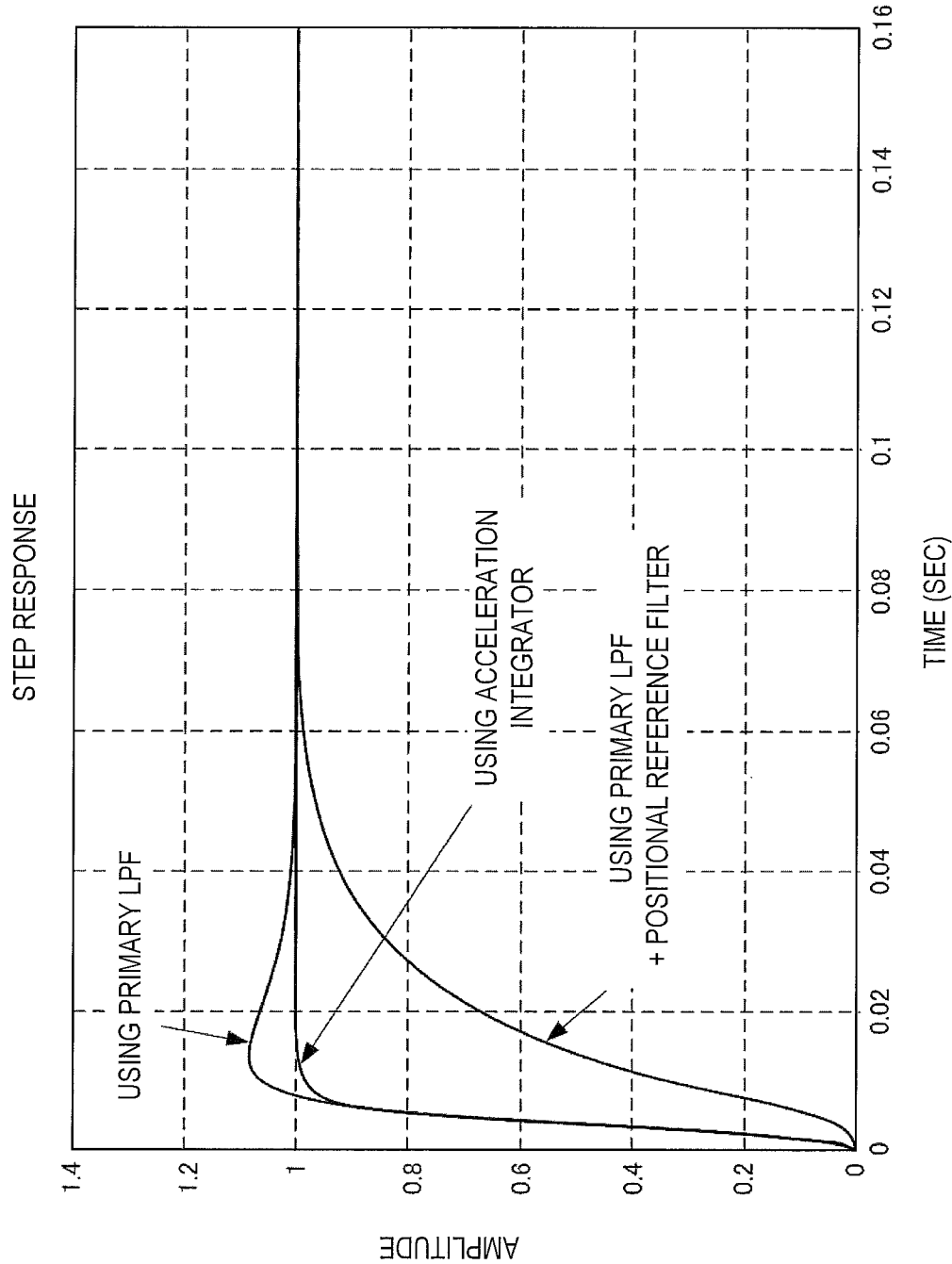
FIG. 14 is a view illustrating a step response when the positional reference filter is used to remove only a zero point.
Figure 15:
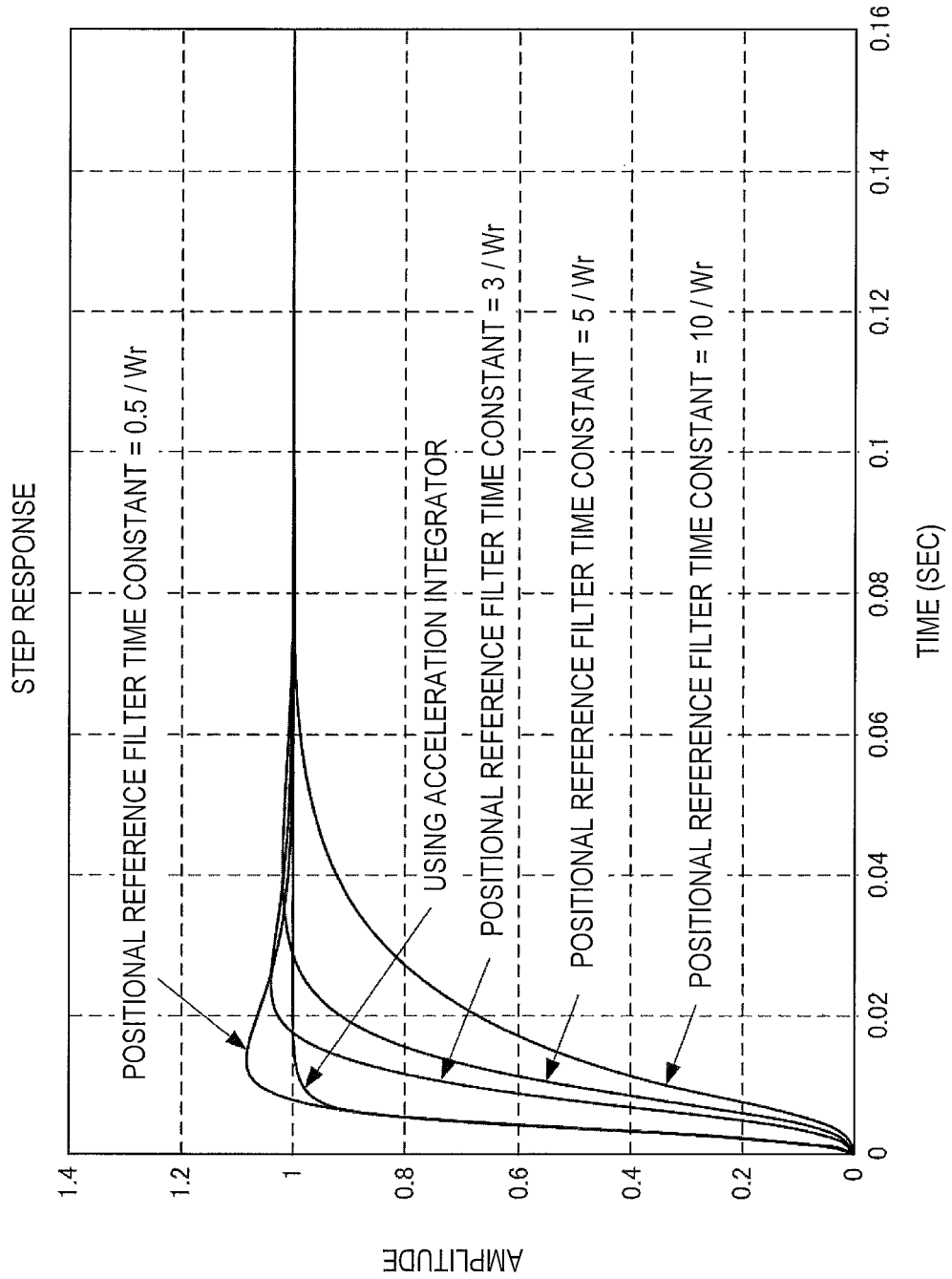
FIG. 15 is a view illustrating a step response when a time constant is changed.

In order to suppress the low frequency vibration resulting from the dipole as examined above, an removal of the zero point of the dipole can be considered to be the simplest approach. As one configuration for that, a positional reference filter 21 having a time constant same as the time constant of the primary low pass filter 28 is provided. Specifically, as illustrated in FIG. 13, a positional reference filter 21a "1/(T·s+1)" having a time constant T in its denominator, which is the same as the time constant T of the denominator of the primary low pass filter 28 "T/(T·s+1)," is provided, and the positional reference Pref is inputted into the first adder/subtractor 22 via the positional reference filter 21a. According to this configuration, as illustrated in FIG. 14, an overshoot which is the low frequency vibration can be suppressed at a step response. However, since the positional reference filter 21a serves as a first order delay element, the rate of the step response will become slow. Thus, by suitably adjusting the time constant T in the positional reference filter 21a, the rate of the step response can also be suitably adjusted as illustrated in FIG. 15. Note that since an overshoot may occur depending on the adjustment of the time constant of the positional reference filter 21a, the adjustment needs to be appropriately carried out using the coefficient diagram method described above.

Figure 16:
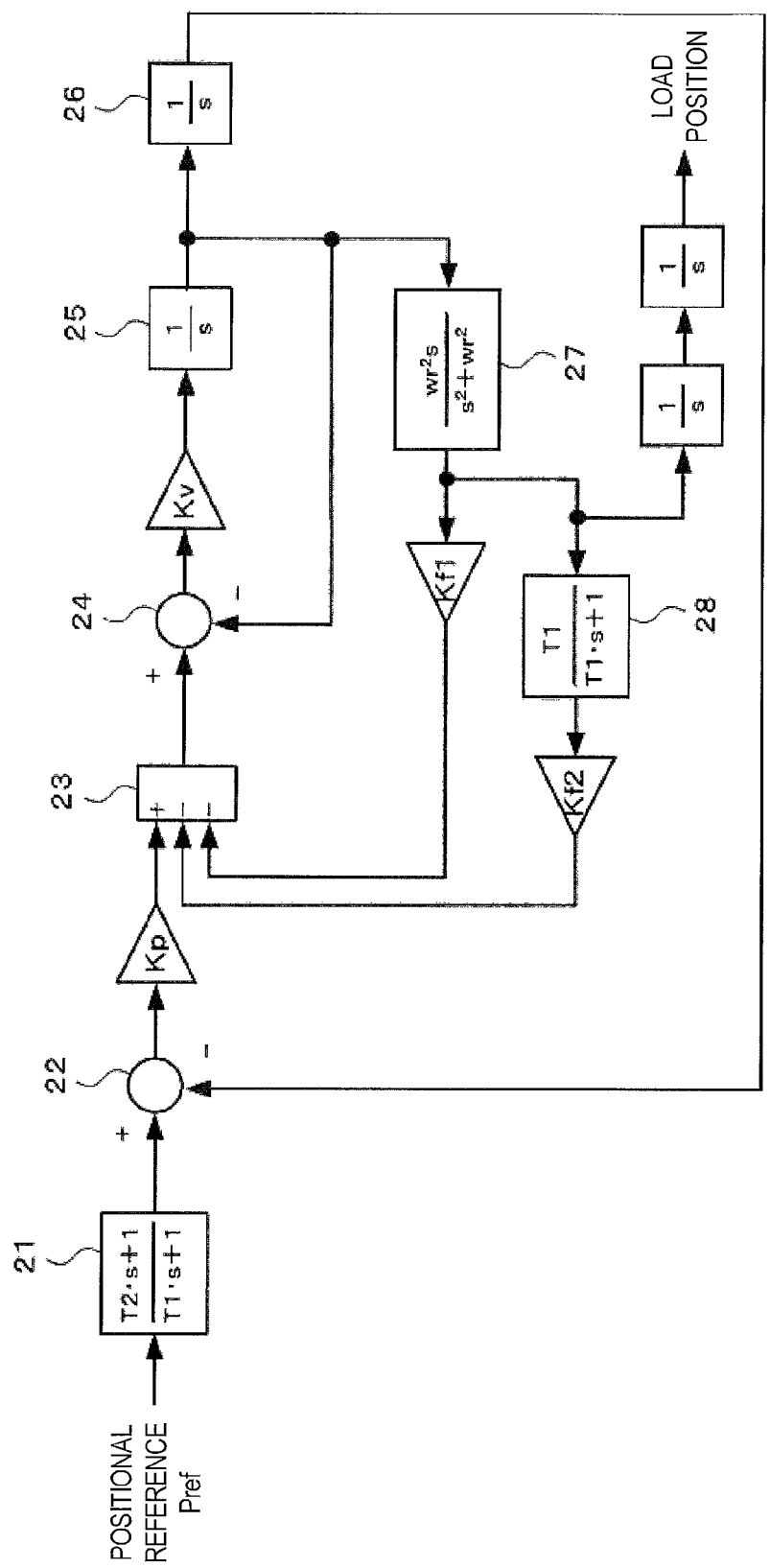
FIG. 16 is a diagram illustrating a step response when dipole removal filters are provided both at a zero point and the pole to remove the entire dipole.

Measures to Suppress Low-Frequency Vibration (2): Remove Both Zero Point and Poles of Dipole By removing, in addition to the zero point, the poles which are in the dipole assignment relation, an increased response rate can be obtained while cancelling the entire dipole and suppressing the low frequency vibration of the machinery 3. Specifically, as illustrated in FIG. 16, a first time constant T1 which is the same as the first time constant T1 in the denominator of the primary low pass filter 28 "T1/(T1·s+1)" is given to the denominator of the positional reference filter 21, and a second time constant T2 which can remove the poles of the transfer function G(s) is given to the numerator of the positional reference filter 21. However, the poles to be removed by the second time constant T2 need to be poles which are in the dipole assignment relation with respect to the zero point among the plurality of poles which the transfer function G(s) has. Since a clear calculation of the poles to be removed is not easy, it is necessary to suitably adjust to set the second time constant T2 after the first time constant T1 is fixed. The positional reference filter 21 "(T2·s+1)/(T1·s+1)" configured as described above particularly functions as a dipole removal filter. Note that the dipole removal filter corresponds to a first dipole removal filter in the claims.

Figure 17:
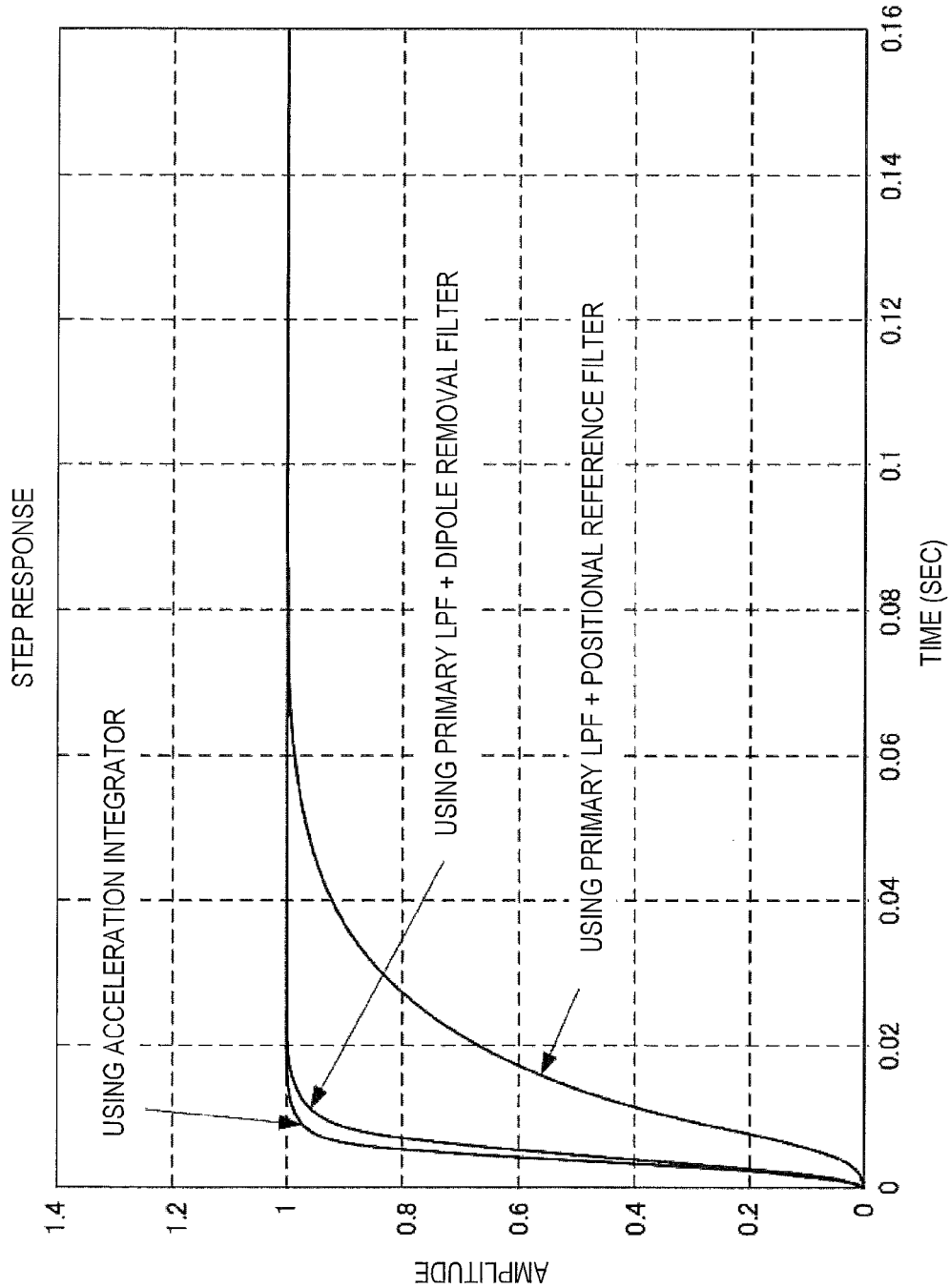
FIG. 17 is a view illustrating a step response when the dipole removal filter is used.
Figure 18:
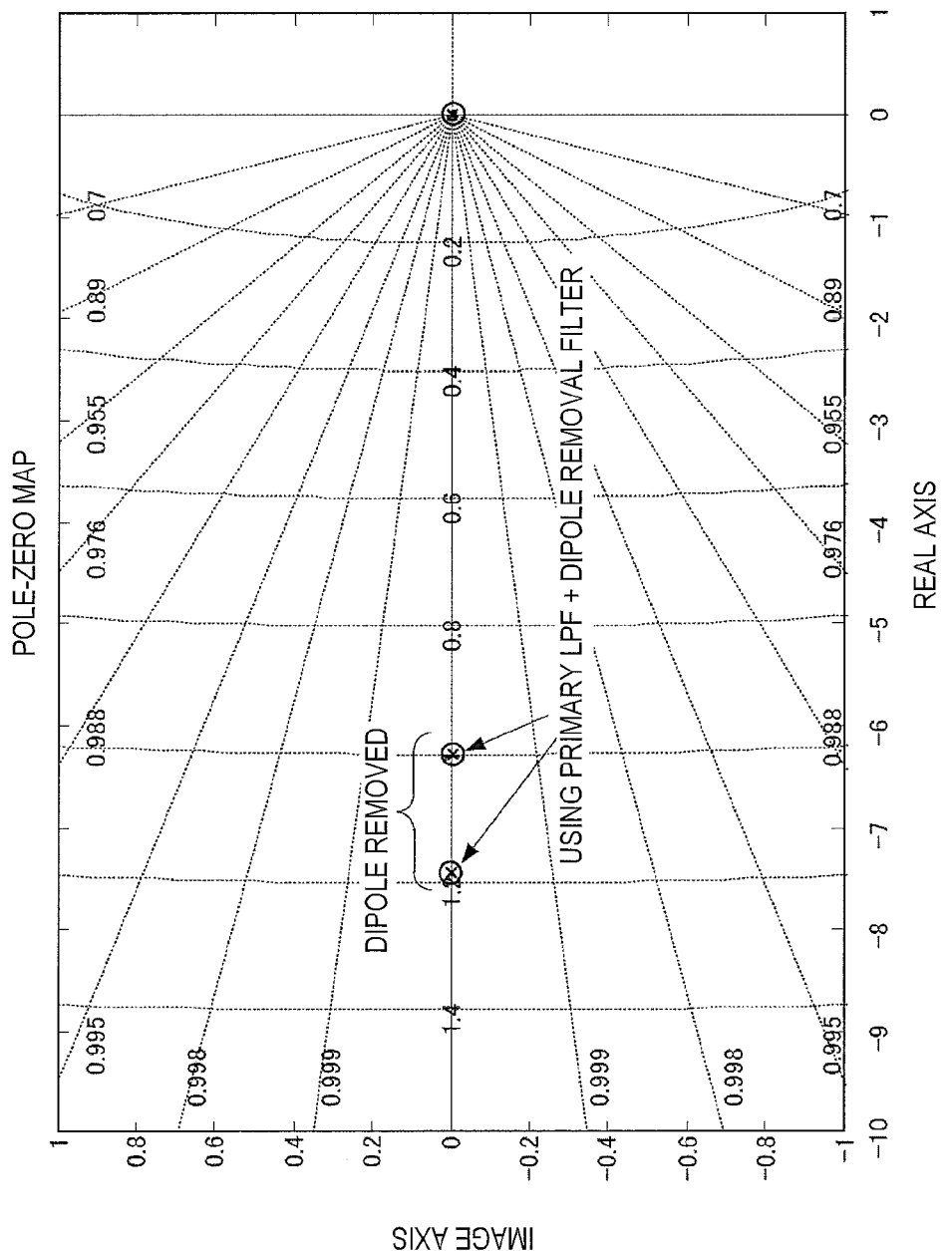
FIG. 18 is a view illustrating a pole assignment near the origin when the dipole removal filter is used.
Figure 19:
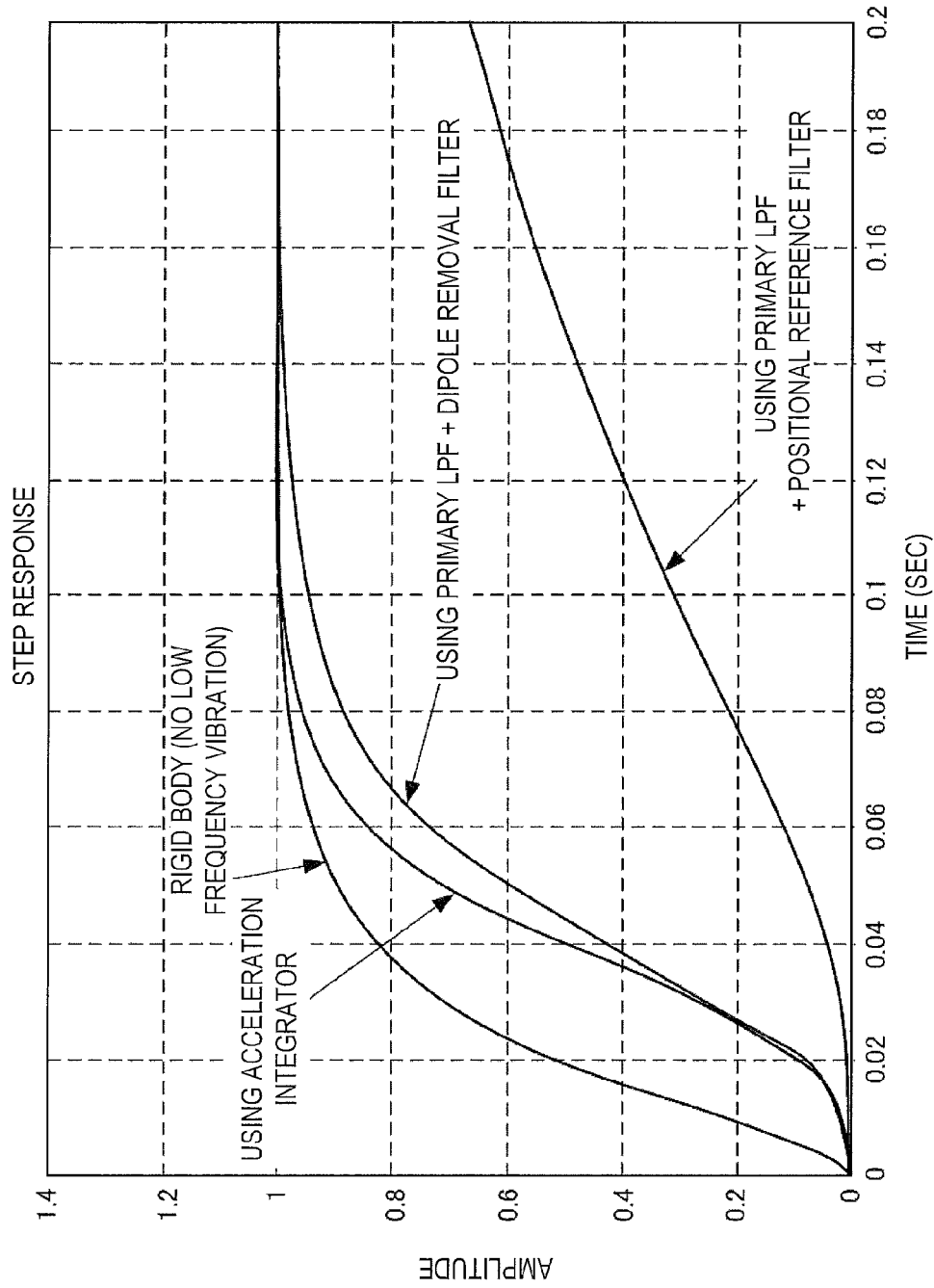
FIG. 19 is a view illustrating a rate of the step response when the dipole removal filter is used.

According to the configuration in which the dipole removal filter 21 is provided, a step response close to the ideal acceleration feedback control where the acceleration integrator 29 is used can be obtained as illustrated in FIG. 17. Further, as illustrated in FIG. 18 which corresponds to FIG. 12, the zero point and the pole which are in a dipole assignment relation in the transfer function G(s) are cancelled out by the pole and the zero point of the dipole removal filter 21 itself, respectively. That is, the dipoles of the entire control system is canceled. Thus, the low frequency vibration in the machinery 3 can be suppressed nearly completely. In addition, since the dipole removal filter 21 itself is a filter having the zero point and the pole which are in the dipole assignment relation, there is almost no filter delay. Thus, as illustrated in FIG. 19, the rate of the step response also becomes nearly the ideal speed. Therefore, in the control system model of FIG. 2 in which the detection configuration of the load position is removed from the configuration of FIG. 16, a step response with a less delay which suppresses the low frequency vibration is possible, without using the acceleration integrator 29 for the acceleration feedback control.

As described above, according to the motor controlling device 2 and the machinery system S of this embodiment, the positional reference filter 21, which generates the second acceleration feedback signal based on the acceleration detection signal, is inputted with the positional reference Pref, and can suppress the low frequency vibration of the machinery 3. Therefore, vibration of the machinery 3 which is low in rigidity can be suppressed, while the generation of overshoot when positioning the machinery 3 can be suppressed.

According to this embodiment, the acceleration feedback signal is generated from the acceleration detection signal via the primary low pass filter 28 and the second acceleration feedback gain Kf2, and the positional reference filter 21 has, in its transfer function, the time constant T1 same as the time constant T1 of the primary low pass filter 28. Thus, the positional reference filter 21 can remove the zero point of the transfer function G(s) to suppress the generation of overshoot when positioning the machinery 3.

Further, according to this embodiment, the positional reference filter 21 includes a dipole removal filter having, in its transfer function, the first time constant T1 in the denominator which is same as the time constant T1 of the primary low pass filter 28, and the second time constant T2 in the numerator which can remove the pole of the transfer function G(s). Thus, the zero point and the pole which are in the dipole assignment relation in the transfer function G(s) are respectively cancelled out by the pole and the zero point of the positional reference filter 21 itself which is the dipole removal filter. In other words, the dipoles of the entire control system is canceled. Thus, the low frequency vibration in the machinery 3 is suppressed nearly completely. Since the positional reference filter 21 itself is a filter having the zero point and the pole which are in the dipole assignment relation, there is almost no filter delay and the rate of the step response also becomes the nearly ideal speed.

Note that a particular configuration is not limited to the above embodiment, and various modifications are possible within the scope of the invention, without departing from the meaning and technical idea of the invention. Hereinafter, such modifications will be described one by one.

(1) When High Pass Filter is Provided for Acceleration Feedback Control

In the above embodiment, the second acceleration feedback signal is generated based on the acceleration detection signal only by the primary low pass filter 28 and the second acceleration feedback gain Kf2. However, since the acceleration sensor 14 cannot accurately measure a frequency below a lower limit of the rated measurement range, it can consider a configuration in which a primary high pass filter is provided in series to the primary low pass filter 28, and the effects of the low-frequency component which cannot be accurately measured are removed. In this case, a positional reference filter 21A for the high pass filter, which can remove the zero point and the pole produced by the primary high pass filter may be further provided.

Figure 20:
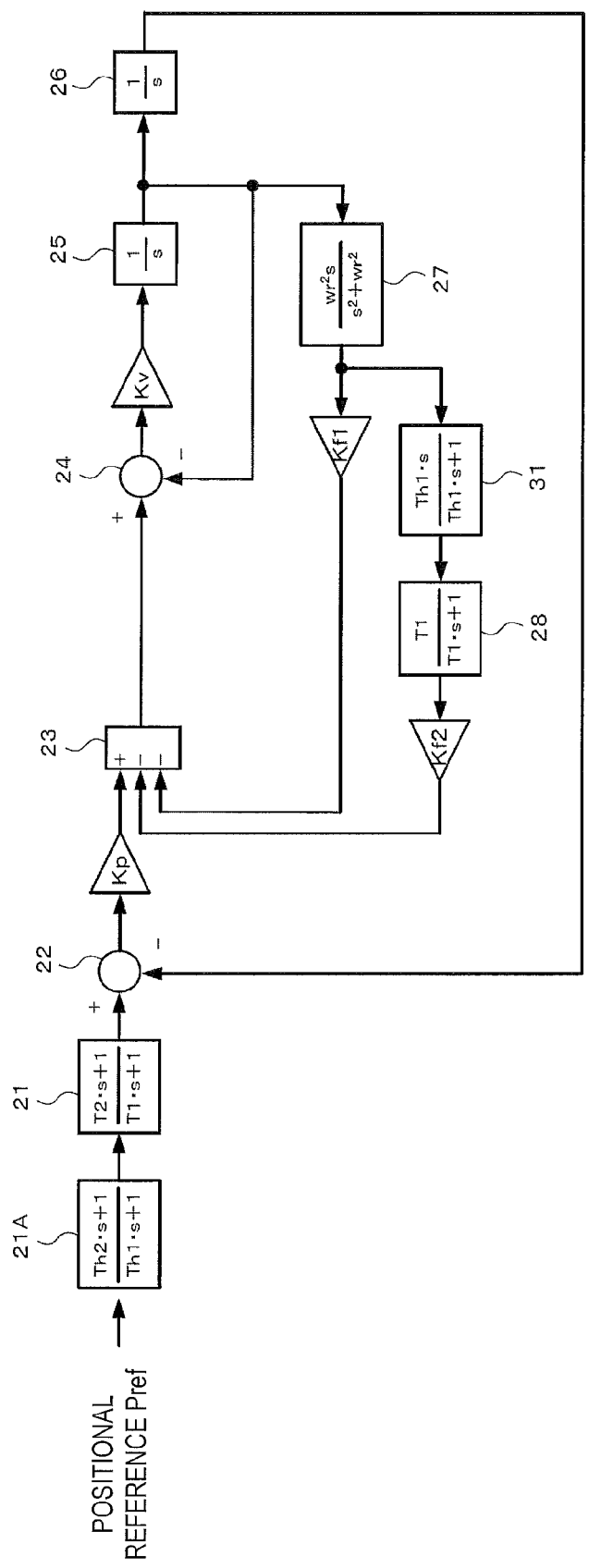
FIG. 20 is a diagram illustrating a control system model when a high pass filter is used for an acceleration feedback control.

For example, as illustrated in FIG. 20 corresponding to FIG. 2, the acceleration detection signal outputted from the machinery model 27 is inputted into a primary high pass filter 31, and its output is inputted into the primary low pass filter 28. The positional reference Pref from the host controller 1 is inputted into the high pass filter positional reference filter 21A, and its output is inputted into the positional reference filter 21. Since other configurations are the same as that of FIG. 2, description thereof is omitted. Note that the positional reference filter 21 and the high pass filter positional reference filter 21A correspond to a positional reference filter in the claims.

The primary high pass filter 31 can be expressed by a transfer function $Th1 \cdot s/(Th1 \cdot s+1)$ having a first high pass filter time constant Th1 in the denominator and the numerator.

The high pass filter positional reference filter 21A is comprised of a filter of a transfer function $(Th2 \cdot s+1)/(Th1 \cdot s+1)$ having in the denominator a first high pass filter time constant Th1 which is same as that in the denominator of the primary high pass filter 31, and a second high pass time constant Th2 in the numerator.

In the control system model configured in this way, in addition to a dipole of the zero point and the pole corresponding to the first time constant of the primary low pass filter 28, a dipole of the zero point and the pole corresponding to the first high pass filter time constant Th1 of the primary high pass filter 31 is also produced in the transfer function G(s) from the positional reference inputted into the first adder/subtractor 22 to the load position of the machinery 3. In the high pass filter positional reference filter 21A, the dipole of the zero point and the pole corresponding to the first high pass filter time constant Th1 can be removed by the high pass filter positional reference filter 21A suitably adjusting the second high pass time constant Th in the numerator. Thus, the positional reference filter 21 and the high pass filter positional reference filter 21A can remove all the dipoles of the transfer function G(s) to suppress the low frequency vibration of the entire control system. Note that the first high pass filter time constant Th1 corresponds to a third time constant in the claims, the second high pass filter time constant Th2 corresponds to a fourth time constant in the claims, and the high pass filter positional reference filter 21A corresponds to a second dipole removal filter in the claims.

(2) When Machinery Vibrates in Multiple Mode of Vibration

Figure 21:
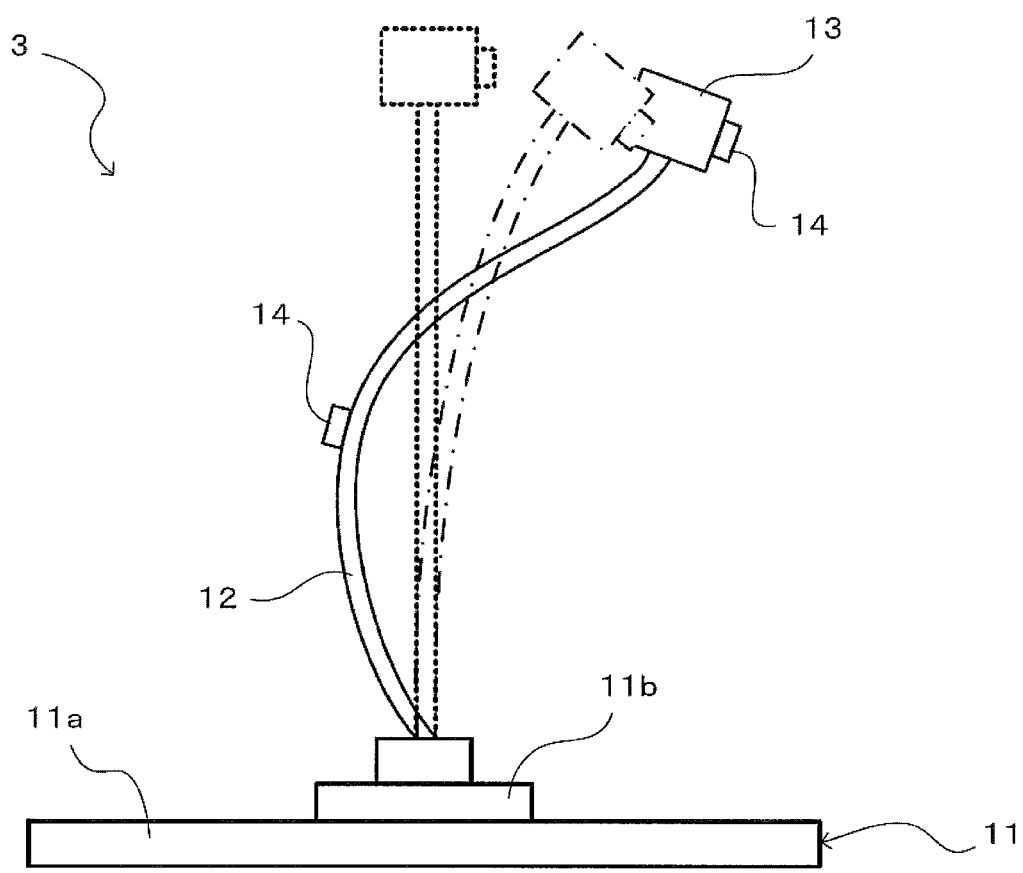
FIG. 21 is a view illustrating a secondary mode of vibration in the machinery.

In the above embodiment, as illustrated with a dashed dotted line in FIG. 21, it is premised on the case of the primary mode of vibration where the end effector 13 of the machinery 3 vibrates simply. However, depending on the parameter settings of the machinery 3, as illustrated with a solid line in FIG. 21, vibration may occur in a multiple mode of vibration where the elastic rod 12 and the end effector 13 vibrate individually. In this case, the acceleration sensor 14 is installed at parts of the two links of the elastic rod 12 and the end effector 13 constituting the machinery 3, which have the largest amplitude, respectively. In this example, one acceleration sensor 14 is provided to an anti-node part of vibration of the elastic rod 12, and anther acceleration sensor 14 is provided to one end face of the end effector 13 in the moving direction thereof. In addition, the acceleration feedback control is preferred to be performed in parallel corresponding to the acceleration detection signals from the acceleration sensors 14.

Figure 22:
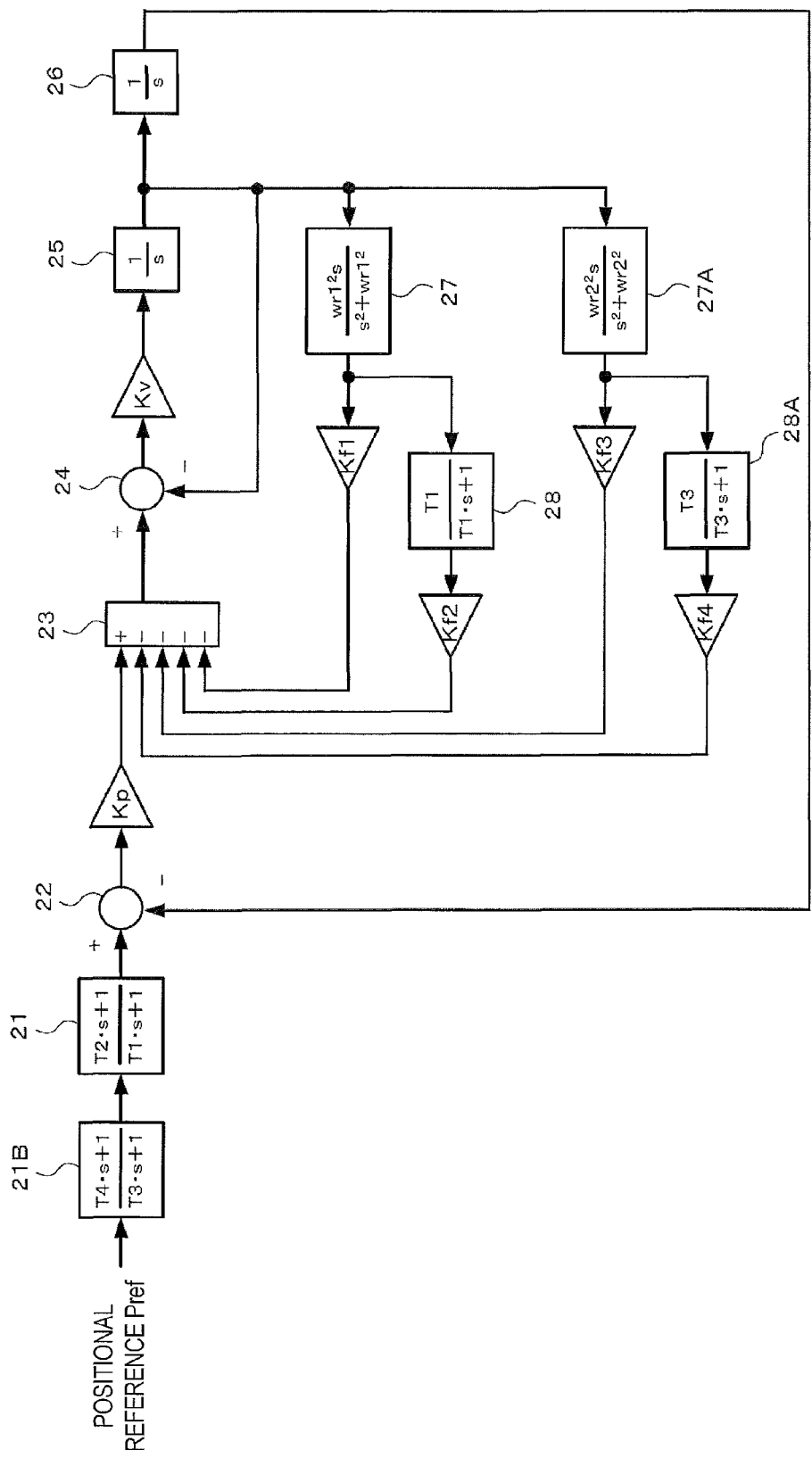
FIG. 22 is a diagram illustrating a control system model corresponding to a secondary vibrating motor.

In this case, as illustrated in FIG. 22 corresponding to FIG. 2, a first acceleration feedback loop provided with the first machinery model 27, the first acceleration feedback gain Kf1, the first low pass filter 28, and the second acceleration feedback gain KC, and a second acceleration feedback loop provided with the second machinery model 27A, a third acceleration feedback gain Kf3, the second low pass filter 28A, and a fourth acceleration feedback gain Kf4, are provided in parallel to each other. In addition, the first positional reference filter 21 corresponding to the first acceleration feedback loop and the second positional reference filter 21B corresponding to the second acceleration feedback loop are provided in series.

In the control system model configured in this way, in addition to the dipole of the zero point and the pole corresponding to the first time constant T1 of the first low pass filter 28, the dipole of the zero point and the pole corresponding to the third time constant T3 of the second low pass filter 28A is also produced in the transfer function G(s) from the positional reference Pref inputted into the first adder/subtractor 22 to the load position of the machinery 3. Each zero point is removed by assigning the first time constant T1 and the third time constant T3 to the respective denominators of the positional reference filters 21 and 21B, and each pole is removed by suitably adjusting the second time constant T2 and the fourth time constant T4 in the respective numerators. Thus, the respective positional reference filters 21 and 21B can remove all the dipoles of the transfer function G(s), and can suppress the low frequency vibration in the entire control system. Note that, even if the number of links constituting the machinery 3 is three or more, the same number of acceleration sensors 14, acceleration feedback loops, and positional reference filters 21 may be provided as the number of links of the machinery 3.

Note that, in the above embodiment and/or respective modifications, although the case where the linear motor 11 which is a linear-movement type is used for the actuator for driving the machinery 3 is described, it is not limited to this. Other than this, although not illustrated in particular, the machinery may have a configuration in which a movable table is driven by using an actuator such as a rotary motor and a ball screw. In this case, in the control system model of the machinery system S, the motor model 25 can be used as it is, as a model of the rotary motor, if only the content of the machinery model 27 is suitably changed.

Other than the above, the approaches by the above embodiment and/or the modification(s) may suitably be combined. Various changes other than the above, although each change is not illustrated, may be made to the above embodiment and the modification(s) and implemented, within the scope without departing from the meaning of the embodiment and the modification(s).

What is claimed is:

1. A motor controlling device comprising:
   a position controller to generate a speed reference based on a positional reference and a motor position;
   a speed controller to generate a torque reference based on the speed reference and a motor speed;
   a motor drive to drive a motor based on the torque reference, the motor being to drive machinery to which an acceleration sensor is attached;
   an acceleration feedback signal generator to generate a feedback signal to the speed reference based on an acceleration detection signal that is a detection signal of the acceleration sensor, the acceleration feedback signal generator including a primary low pass filter and a primary high pass filter arranged in series to the primary low pass filter; and
   a positional reference filter inputted with the positional reference and suppressible of low frequency vibration of the machinery, the positional reference filter having a time constant same as a time constant of the primary low pass filter in a transfer function thereof, the time constant of the positional reference filter is the same as a time constant of the primary high pass filter in the transfer function.

2. The motor controlling device of claim 1,
   wherein the acceleration feedback signal generator has a gain, and generates the feedback signal based on the acceleration detection signal via the primary low pass filter and the gain.

3. The motor controlling device of claim 1,
   wherein the positional reference filter is provided with a first dipole removal filter having a first time constant in a denominator and a second time constant in a numerator of the transfer function,
   wherein the first time constant is the same as the time constant of the primary low pass filter, and the second time constant is a time constant that can remove a pole of a transfer function from the positional reference to the position of the machinery.

4. The motor controlling device of claim 1,
   wherein the positional reference filter is provided with a second dipole removal filter having a third time constant in a denominator and a fourth time constant in a numerator of the transfer function, and
   wherein the third time constant is the same as the time constant of the primary high pass filter, and the fourth time constant is a time constant that can remove a pole of a transfer function from the positional reference to the position of the machinery.

5. The motor controlling device of claim 1,
   wherein the machinery is comprised of N links (here, N is an integer of two or greater) connected in series to each other and having a multiple mode of vibration,
   wherein the acceleration feedback signal generator includes N acceleration feedback signal generators in parallel to each other, corresponding to acceleration detection signals from N acceleration sensors attached to tip ends or anti-node parts of the N links, respectively, and
   wherein the positional reference filter includes N positional reference filters in series to each other, corresponding to the N acceleration feedback signal generators, respectively.

6. A method of controlling a motor, performed in a motor controlling device including a position controller to generate a speed reference based on a positional reference and a motor position, a speed controller to generate a torque reference based on the speed reference and a motor speed, a motor drive to drive the motor based on the torque reference, the motor being to drive machinery, a primary low pass filter, and a primary high pass filter arranged in series to the primary low pass filter, the method comprising:
   generating a feedback signal to the speed reference based on an acceleration detection signal that is a detection signal of an acceleration sensor attached to the machinery; and
   filtering the positional reference to suppress low frequency vibration of the machinery using a positional reference filter having a time constant same as a time constant of the primary low pass filter in a transfer function thereof, the time constant of the positional reference filter is the same as a time constant of the primary high pass filter in the transfer function.

7. A machinery system comprising:
   a motor;
   machinery driven by the motor, an acceleration sensor attached to the machinery,
   a motor controlling device comprising:
      a position controller to generate a speed reference based on a positional reference and a motor position;
      a speed controller to generate a torque reference based on the speed reference and a motor speed;
      a motor drive to drive the motor based on the torque reference;
      an acceleration feedback signal generator to generate a feedback signal to the speed reference based on an acceleration detection signal that is a detection signal of the acceleration sensor, the acceleration feedback signal generator including a primary low pass filter and a primary high pass filter arranged in series to the primary low pass filter; and
      a positional reference filter inputted with the positional reference and suppressible of low frequency vibration of the machinery, the positional reference filter having a time constant same as a time constant of the primary low pass filter in a transfer function thereof, the time constant of the positional reference filter is the same as a time constant of the primary high pass filter in the transfer function.

* * * * *